(12) United States Patent
Kawamura et al.

(10) Patent No.: US 7,431,898 B2
(45) Date of Patent: *Oct. 7, 2008

(54) CHEMICAL REACTION APPARATUS AND POWER SUPPLY SYSTEM

(75) Inventors: Yoshihiro Kawamura, Fussa (JP); Naotsugu Ogura, Fussa (JP); Akira Igarashi, Saitama (JP)

(73) Assignee: Casio Computer Co., Ltd., Tokyo (JP)

( * ) Notice: Subject to any disclaimer, the term of this patent is extended or adjusted under 35 U.S.C. 154(b) by 276 days.

This patent is subject to a terminal disclaimer.

(21) Appl. No.: 10/479,009

(22) PCT Filed: Mar. 28, 2003

(86) PCT No.: PCT/JP03/04001

§ 371 (c)(1),
(2), (4) Date: Nov. 24, 2003

(87) PCT Pub. No.: WO03/083984

PCT Pub. Date: Oct. 9, 2003

(65) Prior Publication Data

US 2004/0148859 A1    Aug. 5, 2004

(30) Foreign Application Priority Data

Mar. 29, 2002  (JP)  ............... 2002-094272
Mar. 29, 2002  (JP)  ............... 2002-094273

(51) Int. Cl.
*B01J 8/04*  (2006.01)
*C10L 3/00*  (2006.01)

(52) U.S. Cl. ............ 422/190; 422/211; 48/127.7; 48/127.9; 48/198.1; 429/17; 429/19; 429/22; 429/23

(58) Field of Classification Search ............ 422/190, 422/211; 48/127.7, 127.9, 198.1, 61; 429/19, 429/22, 17, 23
See application file for complete search history.

(56) References Cited

U.S. PATENT DOCUMENTS 5,716,842 A    2/1998  Baier et al.

(Continued)

FOREIGN PATENT DOCUMENTS

DE    199 20 786 A1    11/2000

(Continued)

OTHER PUBLICATIONS

Poser, S. et al. "Chip elements for fast thermocycling" Sensors and Actuators A, Elsevier Sequoia S.A., Lausanne, CH, vol. 62, No. 1-3, Jul. 1, 1997, pp. 672-675, XP004119707, ISSN: 0924-4247.

(Continued)

*Primary Examiner*—N. Bhat
(74) *Attorney, Agent, or Firm*—Frishauf, Holtz, Goodman & Chick, P.C.

(57) ABSTRACT

A chemical reaction apparatus includes a solid body in which a reaction flow path is formed, and a heater having a thin-film heater formed on the body to oppose the reaction flow path and at least partially exposed to the reaction flow path, and which supplies a predetermined heat amount to the reaction flow path by the thin-film heater.

23 Claims, 26 Drawing Sheets

U.S. PATENT DOCUMENTS

| | | | |
|---|---|---|---|
| 6,119,889 A | 9/2000 | Fujii et al. | |
| 6,200,536 B1 | 3/2001 | Tonkovich et al. | |
| 6,428,758 B1 * | 8/2002 | Schuessler et al. | 422/239 |
| 6,447,736 B1 * | 9/2002 | Autenrieth et al. | 422/190 |
| 6,638,654 B2 * | 10/2003 | Jankowksi et al. | 429/26 |
| 6,786,716 B1 * | 9/2004 | Gardner et al. | 431/268 |
| 6,824,905 B2 * | 11/2004 | Shioya et al. | 429/22 |
| 6,916,565 B2 * | 7/2005 | Shioya | 429/19 |
| 7,169,367 B2 * | 1/2007 | Takeyama et al. | 422/198 |
| 7,175,817 B2 * | 2/2007 | Kawamura et al. | 422/190 |
| 2002/0094462 A1 * | 7/2002 | Shioya et al. | 429/19 |
| 2003/0039874 A1 | 2/2003 | Jankowski et al. | |
| 2003/0103878 A1 | 6/2003 | Morse et al. | |
| 2003/0138685 A1 * | 7/2003 | Jankowski et al. | 429/30 |
| 2004/0018129 A1 | 1/2004 | Kawamura et al. | |
| 2004/0025784 A1 * | 2/2004 | Kawamura et al. | 117/200 |
| 2004/0043273 A1 | 3/2004 | Jankowski et al. | |
| 2004/0048128 A1 | 3/2004 | Jankowski et al. | |
| 2004/0148858 A1 | 8/2004 | Yamamoto et al. | |

FOREIGN PATENT DOCUMENTS

| | | |
|---|---|---|
| DE | 100 10 400 A1 | 9/2001 |
| DE | 102 42 020 A1 | 3/2003 |
| EP | 0 861 802 A2 | 9/1998 |
| EP | 1 022 059 A2 | 7/2000 |
| EP | 1 188 476 A2 | 3/2002 |
| JP | 2-172538 A | 7/1990 |
| JP | 05-235510 A | 9/1993 |
| JP | 06-111838 A | 4/1994 |
| JP | 6-233918 A | 8/1994 |
| JP | 7-159215 A | 6/1995 |
| JP | 08-508197 A | 9/1996 |
| JP | 10-268343 A | 10/1998 |
| JP | 10-284836 A | 10/1998 |
| JP | 11-031577 A | 2/1999 |
| JP | 2000-026105 A | 1/2000 |
| JP | 2000-506432 A | 5/2000 |
| JP | 2002-18271 A | 1/2002 |
| JP | 2003-045459 A | 2/2003 |
| JP | 2003-526359 A | 9/2003 |
| JP | 2004-537392 A | 12/2004 |
| WO | WO 99/41015 A1 | 8/1999 |
| WO | WO 00/45457 A1 | 8/2000 |
| WO | WO 01/41931 A2 | 6/2001 |
| WO | 02/24322 A2 | 3/2002 |
| WO | WO 03/082460 A1 | 10/2003 |
| WO | WO 2004/030805 A1 | 4/2004 |

OTHER PUBLICATIONS

Srinivasan R. et al., "Mircomachined Reactors For Catalytic partial Oxidation Reactions" Aiche Journal, New York, NY US, vol. 43, No. 11, Nov. 1997, pp 3059-3069, XP000669285, ISSN: 0001-1541.

Derwent Abstract Accession No. 2003-407946/39, JP 2003-045459 A (Casio Computer Co. LTD), Feb. 14, 2003.

Derwent Abstract Accession No. 2003-581544/55, JP 2003-168685 A (Casio Computer Co. LTD), Jun. 13, 2003.

* cited by examiner

US 7,431,898 B2

CHEMICAL REACTION APPARATUS AND POWER SUPPLY SYSTEM

This application is a U.S. National Phase Application under 35 USC 371 of International Application PCT/JP03/04001 filed Mar. 28, 2003.

TECHNICAL FIELD

The present invention relates to a chemical reaction apparatus and a power supply system including this chemical reaction apparatus and, more particularly, to a chemical reaction apparatus applied to a power supply system including a fuel cell which generates electric power by using fuel.

BACKGROUND ART

In the technical field of chemical reactions, chemical reaction apparatuses are known in which various fluidized material mixtures are supplied to flow paths to cause chemical reactions, i.e., catalyst reactions with catalysts placed in the flow paths, thereby producing desired fluid materials.

These chemical reaction apparatuses have various scales and structures in accordance with their applications. For example, in a certain relatively small-sized chemical reaction apparatus, a micron-order or millimeter-order flow path is formed in a silicon substrate by using the micropatterning technique developed in the technology for fabricating semiconductors such as semiconductor integrated circuits, and a fluid is supplied to this flow path to cause a chemical reaction.

FIG. 25 is an opened-up plan view showing an example of such conventional chemical reaction apparatuses. FIG. 26 is a sectional view taken along a line B-B in FIG. 25.

This chemical reaction apparatus includes a silicon substrate 1. In one surface of the silicon substrate 1, a fine zigzagged flow path 2 is formed by using the micropatterning technique developed in the semiconductor fabrication technology. Various fluids for performing chemical reactions are supplied into the flow path 2. On the inner wall surfaces of the flow path 2, a catalyst layer 3 for performing a chemical reaction is formed as needed.

A glass plate 4 serving as a lid is stacked and bonded to the one surface of the silicon substrate 1. An inlet port 5 and outlet port 6 are formed in those two predetermined portions of the glass plate 4, which correspond to the two end portions of the flow path 2.

On the other surface of the silicon substrate 1, a thin-film heater 7 which is zigzagged in accordance with the flow path 2 is formed. If the chemical reaction (catalyst reaction) in this chemical reaction apparatus induces an endothermic reaction under predetermined heat conditions, the thin-film heater 7 supplies predetermined thermal energy to the catalyst layer 3 in the flow path 2 upon the chemical reaction.

An application of this chemical reaction apparatus having the above arrangement will be explained below.

For example, research and development for putting a power supply system using a fuel cell into practical use have been extensively done in recent years. A chemical reaction apparatus having the above arrangement can be used in this power supply system using a fuel cell. That is, by this chemical reaction apparatus, hydrogen can be produced from a power generation fuel gas and supplied to the fuel cell, and the power supply system using the fuel cell can be downsized.

While the thin-film heater 7 heats the interior of the flow path 2 to a predetermined temperature, the power generation fuel gas described above is supplied into the flow path 2 from the inlet port 5. This causes an endothermic reaction by the catalyst layer 3 in the flow path 2 to produce hydrogen and carbon dioxide as byproducts. Of these products, only hydrogen can be produced by removing carbon dioxide from hydrogen. Electric power can be generated by supplying this hydrogen to the fuel cell.

In the above conventional chemical reaction apparatus, the interior of the flow path 2 is heated by supplying electric power to the thin-film heater 7. Therefore, the heating temperature in the flow path 2 can be controlled relatively easily by controlling the electric power supplied to the thin-film heater 7. However, relatively large electric power is required for heating.

Also, since the thin-film heater 7 is formed on the other surface of the silicon substrate 1, the thermal energy is supplied to the catalyst layer 3 in the flow path 2 via the silicon substrate 1 and at the same time radiated to the surroundings. This increases the thermal energy loss and worsens the energy utilization.

DISCLOSURE OF INVENTION

The present invention has the advantages that in a chemical reaction apparatus which includes a flow path for allowing a reaction fluid to flow and perform a desired chemical reaction by heating the interior of the flow path, the energy required for heating can be reduced, the energy utilization can be increased by suppressing the thermal energy loss, and the heating temperature in the flow path can be precisely controlled.

The present invention also has the advantages that when this chemical reaction apparatus is applied to a power supply system using a fuel reforming type fuel cell, the energy required for heating for power generation can be reduced, the energy utilization can be increased by suppressing the thermal energy loss, the power generation efficiency can be increased by precisely controlling the heating temperature for power generation, and the power supply system can be made compact.

To obtain the above advantages, a first chemical reaction apparatus according to the present invention comprises a solid body in which a reaction flow path is formed, and a heating element including a thin-film heater formed in the body to face the reaction flow path and at least partially exposed to the reaction flow path, and supplying a predetermined heat amount to the reaction flow path by the thin-film heater. This chemical reaction apparatus uses at least the thin-film heater as the heating element, and this heating element is partially exposed to the reaction flow path. In this arrangement in which the reaction flow path is heated by the thin-film heater, it is possible to reduce the loss of thermal energy supplied to the reaction flow path, and increase the energy utilization.

As the heating element, the chemical reaction apparatus may further comprise a combustion flow path formed in the body to correspond to the reaction flow path, and having a combustion catalyst layer formed in at least a portion thereof, and which supplies a predetermined heat amount to the reaction flow path by a combustion reaction, caused by the combustion catalyst layer, of a combustion fluid supplied to the combustion flow path. By additionally using heating by the combustion reaction, the electric power supplied to the thin-film heater can be reduced.

To obtain the above advantages, a second chemical reaction apparatus according to the present invention comprises a solid body in which a reaction flow path is formed, and a heating element including a combustion flow path formed in the body to correspond to the reaction flow path, and having a combustion catalyst layer formed in at least a portion thereof, and which supplies a predetermined heat amount to the reaction flow path by a combustion reaction, caused by the combustion catalyst layer, of a combustion fluid supplied to the combustion flow path. As the heating element, this chemical reaction apparatus comprises at least a thermal energy supplying unit which supplies the thermal energy to the reaction flow path by a combustion reaction on the combustion catalyst layer, of the combustion fluid supplied to the combustion flow path.

Accordingly, a desired chemical reaction can be performed by supplying a predetermined combustion fluid to the combustion flow path, and heating the reaction flow path by heat generated by the combustion reaction. Therefore, externally supplied electric energy can be reduced when a chemical reaction is performed. This makes it possible to increase the energy utilization, downsize an apparatus using this chemical reaction apparatus, and reduce the cost.

Also, the combustion fluid supplied to the combustion flow path essentially includes of a first fluid containing at least oxygen and supplied to the first flow path and a second fluid containing oxygen, or consists of a third fluid formed by separating and removing hydrogen from a fluid discharged from the first flow path and a second fluid containing oxygen, and a combustion fluid is produced from a chemical reaction fluid material supplied to the first flow path. Since this obviates the need to separately supply the combustion fluid, it is possible to downsize the chemical reaction apparatus and reduce the cost.

As the heating element, the chemical reaction apparatus may further comprise a plurality of substrates as the body, a thin-film heater formed on a first substrate to correspond to the reaction flow path, and supplies a predetermined heat amount to the reaction flow path by the thin-film heater. In this case, the chemical reaction apparatus may further comprise a second substrate covering the thin-film heater formed on the first substrate, bonded to the surface on which the first substrate, and having a heat insulating recess in a surface which opposes the thin-film heater. By using heating by the thin-film heater in addition to heating by the combustion reaction, the electric power applied to the thin-film heater can be reduced, and precise temperature control can be performed. Consequently, the chemical reaction can be efficiently performed.

Also, the chemical reaction apparatus according to the present invention may further comprise a radiation preventing film which covers at least a portion of the outermost surfaces of the body to suppress radiation of heat from the outer surfaces of the body, and a box member which covers all the outermost surfaces of the body with a heat-insulating space between them. In this manner, the energy utilization can be increased by suppressing the thermal energy loss.

When the chemical reaction apparatus of the present invention is applied to a power supply system including a fuel reforming type fuel cell, it is possible, as a fuel vaporizer, to supply an aqueous solution of methanol as power generation fuel to the reaction flow path, and vaporize this power generation fuel in the reaction flow path by the heating element. As a reforming unit, it is possible to form a reforming catalyst layer in the reaction flow path, and reform the power generation fuel in the reaction flow path by heating the reaction flow path by the heating element, so that hydrogen is produced. As a carbon monoxide removing unit, it is possible to form a selective oxidation catalyst layer in the reaction flow path, and remove carbon monoxide from a gas mixture containing carbon monoxide by heating the reaction flow path by the heating element. Electric power can be generated by supplying hydrogen produced by these units to the fuel cell, and causing hydrogen and oxygen to react with each other.

With this arrangement, it is possible to reduce the energy required for heating for power generation, reduce the energy loss, increase the energy utilization, and thereby downsize the power supply system. In addition, heating by the thin-film heater is also used as the heating element, so precise temperature control can be performed. Since this allows an efficient chemical reaction, the power generation efficiency can be increased.

BEST MODE FOR CARRYING OUT THE INVENTION

Figure 1:
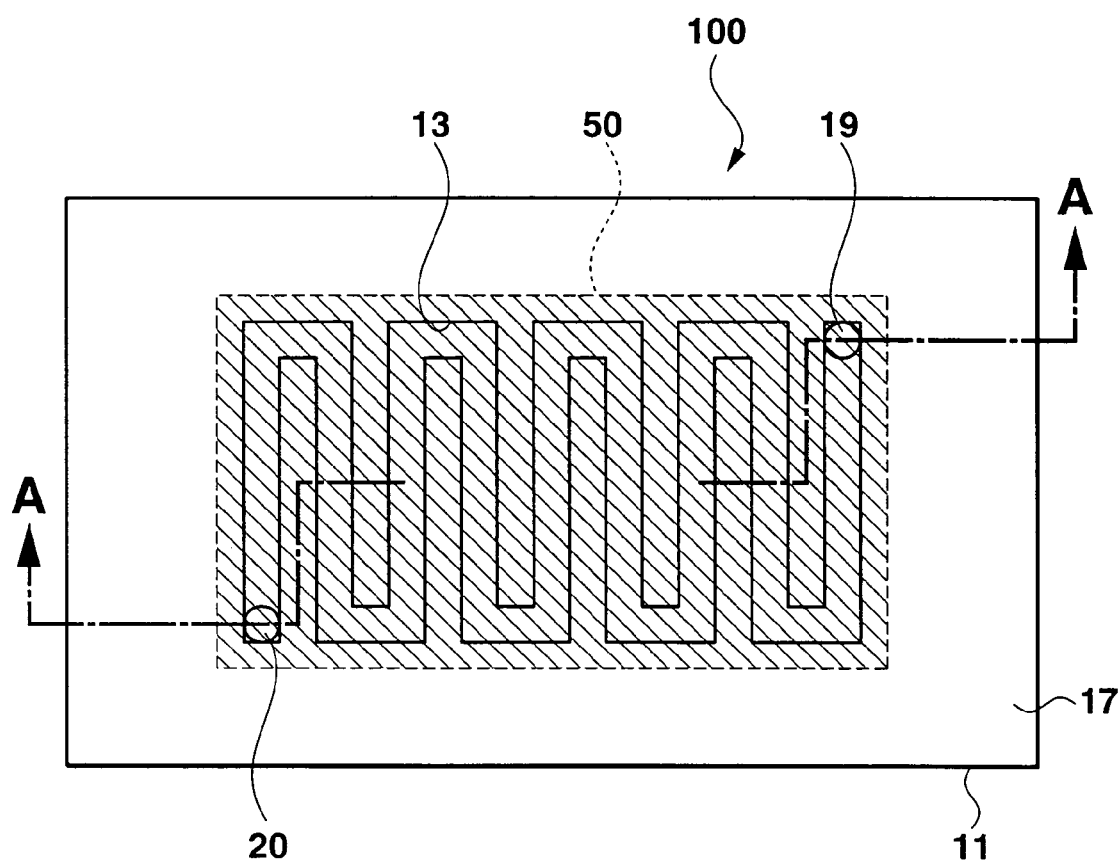
FIG. 1 is an opened-up plan view of the second embodiment of a chemical reaction apparatus according to the present invention.

A chemical reaction apparatus according to the present invention and a power supply system including this chemical reaction apparatus will be described in detail below on the basis of embodiments shown in the drawings.

<Chemical Reaction Apparatus>

First Embodiment

Figure 2:
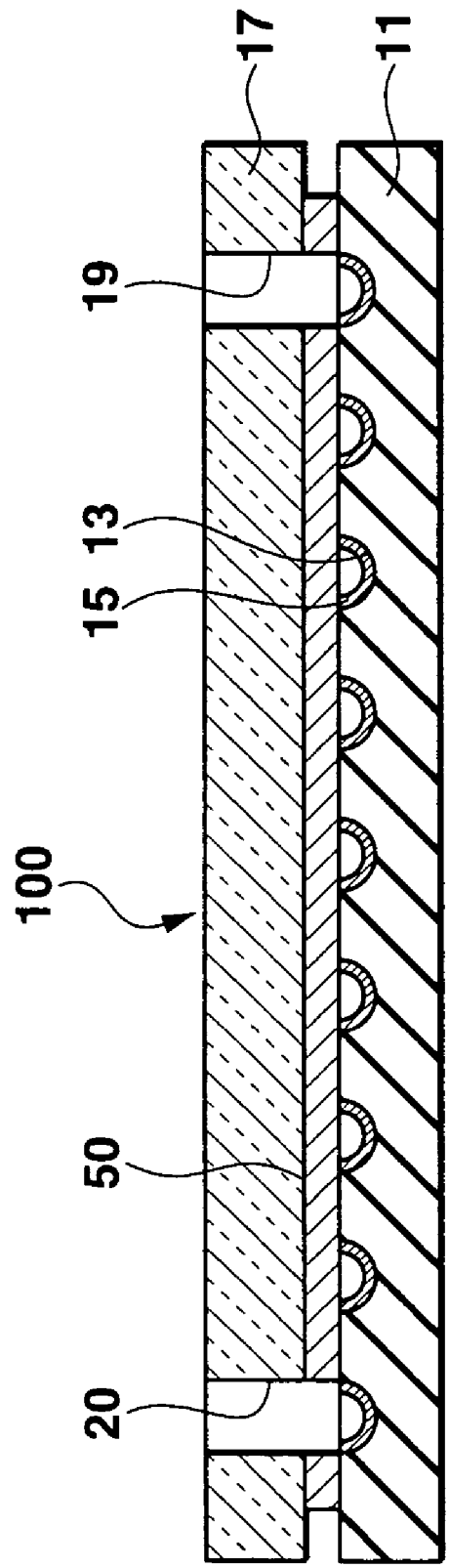
FIG. 2 is a sectional view of the second embodiment of the chemical reaction apparatus according to the present invention.

FIG. 1 is an opened-up sectional view as the first embodiment of a chemical reaction apparatus according to the present invention. FIG. 2 is a sectional view taken along a line A-A of this chemical reaction apparatus.

This chemical reaction apparatus 100 of the first embodiment of the present invention includes rectangular plate-like first and second substrates 11 and 17 stacked and bonded via a thin-film heater 50. The first substrate 11 is, e.g., a silicon substrate, and the second substrate 17 is, e.g., a glass substrate. For example, the first substrate 11 has a length of about 25 mm, a width of about 17 mm, and a thickness of about 0.6 to 1 mm. Also, the second substrate 17 has a thickness of, e.g., about 0.7 mm, and same length and width as the first substrate.

In one flat surface of the first substrate 11, a zigzagged reaction flow path 13 having a predetermined trench-like sectional shape and having an open end of the trench in one surface is formed. A catalyst layer 15 is adhered, if necessary, to the inner wall surfaces of the reaction flow path 13, e.g., the side wall surfaces and bottom surface of the reaction flow path 13.

On one flat surface of the second substrate 17, a thin-film heater 50 is formed into, e.g., a rectangular shape corresponding to the reaction flow path 13. The thin-film heater 50 on one surface of the second substrate 17 is fitted into the trench open end of the reaction flow path 13 in one surface of the first substrate 11, thereby closing the open end of the reaction flow path 13 with the thin-film heater 50. In this way, the thin-film heater 50 is partially exposed to the reaction flow path 13.

Note that the shape of the thin-film heater 50 is not limited to the rectangular shape but may also be a zigzagged shape corresponding to the shape of the reaction flow path 13.

An inlet port 19 and outlet port 20 are formed through those two predetermined portions of the second substrate 17, which correspond to the two end portions of the flow path 13.

The one surface of the first substrate 11 and one surface of the second substrate 17 having the thin-film heater 50 are bonded by anodic bonding.

For example, the reaction flow path 13 is formed such that a trench having an arbitrary sectional shape is so formed as to have a trench open end in one surface of the first substrate 11 by using the photoetching technique or the like, thereby forming a flow path shape having a zigzagged pattern as shown in FIG. 1. In addition, the catalyst layer is formed by adhering a copper-zing (Cu—Zn)-based catalyst having a given thickness (e.g., 1 to 100 μm) to the inner wall surfaces, e.g., the side wall surfaces and bottom surface of the trench by using chemical vapor deposition or the like.

The composition of the thin-film heater 50 is not particularly limited. For example, it is possible to preferably apply a compound $Ta_xSi_yO_zN_w$ having a material composition consisting of tantalum (Ta), silicon (Si), oxygen (O), and nitrogen (N).

The chemical reaction apparatus according to this embodiment has an arrangement in which the thin-film heater is exposed to the reaction flow path. This improves the conduction of the thermal energy supplied from the thin-film heater to the reaction flow path and catalyst layer, and reduces the thermal energy loss. Accordingly, the energy utilization can be increased, and the reaction efficiency of a chemical reaction occurring in the reaction flow path can be increased, or the electric power consumed to supply predetermined thermal energy, i.e., reduce the amount of electric energy charged to the thin-film heater can be reduced.

Second Embodiment

Figure 3:
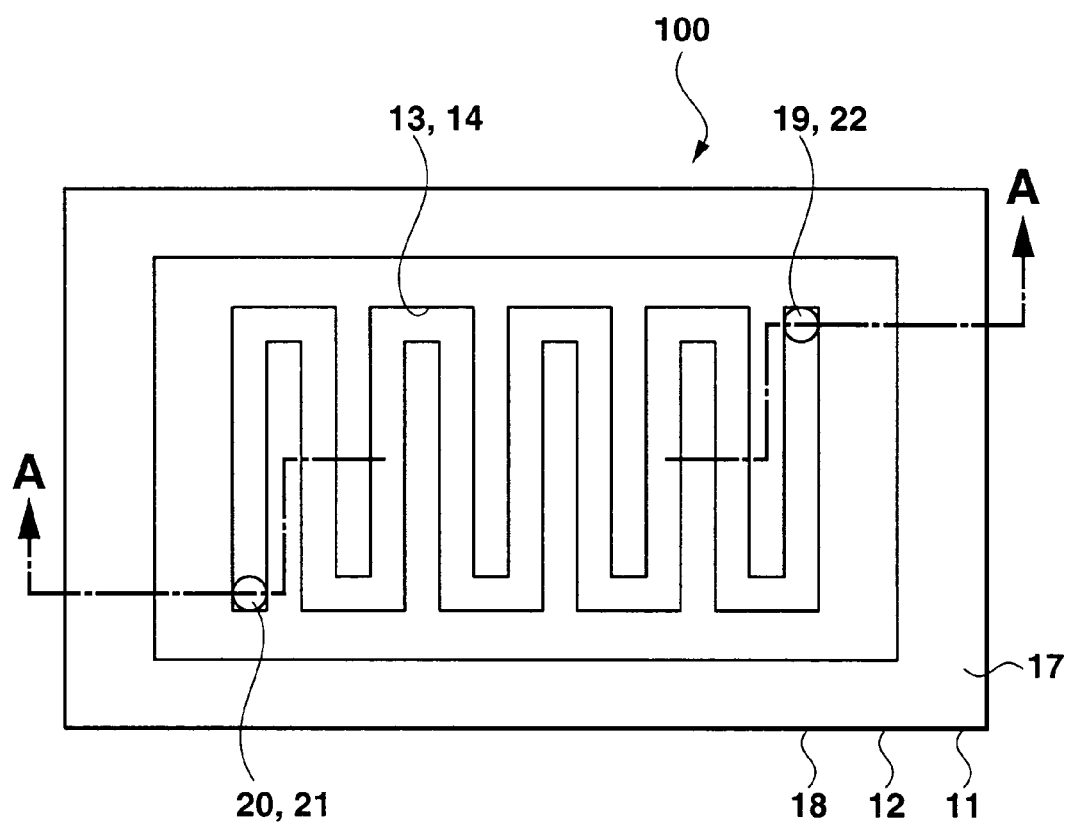
FIG. 3 is an opened-up plan view of the third embodiment of a chemical reaction apparatus according to the present invention.
Figure 4:
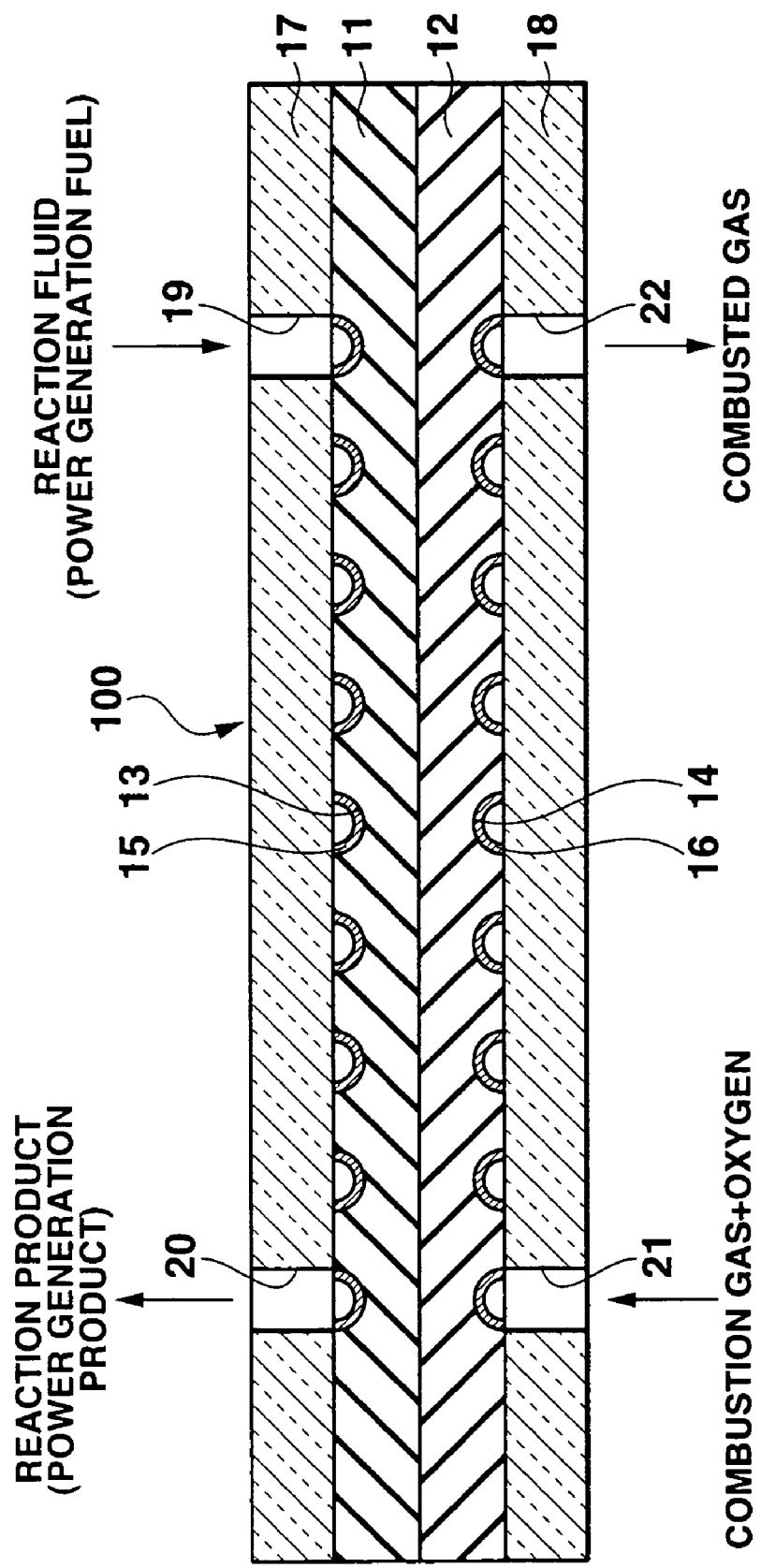
FIG. 4 is a sectional view of the third embodiment of the chemical reaction apparatus according to the present invention.

FIG. 3 is an opened-up plan view as the second embodiment of a chemical reaction apparatus 100 according to the present invention. FIG. 4 is a sectional view taken along a line A-A of the chemical reaction apparatus 100.

The chemical reaction apparatus 100 of the second embodiment has first and second substrates 11 and 12 adjacent to each other. These first and second substrates 11 and 12 are, e.g., rectangular, plate-like substrates made of a semiconductor material such as silicon. For example, the first and second substrates 11 and 12 are adhered via an adhesive, but they may also be simply brought into tight contact with each other without using any adhesive. The dimensions of the first and second substrates 11 and 12 are, e.g., a length of about 25 mm, a width of about 17 mm, and a thickness of about 0.6 to 1 mm.

First and second fine zigzagged flow paths 13 and 14 having a substantially semicircular section are formed in one surface or the upper surface of the first substrate 11 and the other surface or lower surface of the second substrate 12, respectively, by using the micropatterning technique developed in the semiconductor fabrication technology. The dimensions of these two flow paths 13 and 14 are, e.g., a width of about 0.2 to 0.8 mm, a depth of about 0.2 to 0.6 mm, and a total length of about 30 to 1,000 mm.

A reaction catalyst layer 15 for performing a desired chemical reaction is formed on the inner wall surface of the flow path 13 in the first substrate 11. The reaction catalyst layer 15 may be formed on the entire inner wall surface of the flow path 13, or may also be partially formed. The present invention is not limited to this form in which the reaction catalyst layer 15 is formed on the inner wall surface of the flow path 13, but includes a form in which only the flow path 13 is formed and no reaction catalyst layer is formed.

A combustion catalyst layer 16 is formed on the inner wall surface of the flow path 14 of the second substrate 12. The combustion catalyst layer 16 may be formed on the entire inner wall surface of the flow path 14, or may also be partially formed. The combustion catalyst layer 16 is made of a material such as a metal, e.g., Pt, Au, or Ag, which functions as a catalyst for combustion.

Third and fourth substrates 17 and 18, each of which is a rectangular, plate-like glass substrate about 0.7 mm thick serving as a lid, are stacked and bonded to one surface or the upper surface of the first substrate 11 and the other surface or lower surface of the second substrate 12, respectively. This bonding may be adhesion using an adhesive or bonding performed by an anodic bonding process. The dimensions of the rectangle of these third and fourth substrates 17 and 18 are preferably the same as the first and second substrates.

In those two predetermined portions of the third substrate 17, which correspond to the two end portions of the flow path 13, an inlet port 19 and outlet port 20 open in the upper surface of the substrate 17 are formed. In those two predetermined portions of the fourth substrate 18, which correspond to the two end portions of the flow path 14, an inlet port 21 and outlet port 22 open in the lower surface of the substrate 18 are formed. The arrangement of the inlet port 19 and outlet port 20 of the third substrate 17 is opposite to that of the inlet port 21 and outlet port 22 of the fourth substrate 18. That is, as shown in FIG. 3, the inlet port 19 and outlet port 22 are concentrically formed, and the outlet port 20 and inlet port 21 are also concentrically formed.

In the chemical reaction apparatus 100, various reaction fluids are supplied into the flow path 13 of the first substrate 11 through the inlet port 19 of the third substrate 17, and a desired chemical reaction is induced in the flow path 13 by heating the flow path 13 by the thermal energy of a combustion reaction to be described later. The resultant reaction products are discharged from the outlet port 20 of the third substrate 17. When the chemical reaction apparatus 100 is applied to a reforming unit of a power supply system using a fuel cell to be described later, a power generation fuel gas formed by vaporizing, e.g., an aqueous solution of methanol is supplied as a reaction fluid. A desired chemical reaction is induced in the first flow path 13, and a power generation product (hydrogen) is discharged as the reaction product from the outlet port 20 of the third substrate 17.

A combustion fluid containing a combustion gas, hydrogen, for example, and oxygen taken from the atmosphere is supplied into the flow path 14 of the second substrate 12 through the inlet port 21 of the fourth substrate 18. This supplied combustion fluid combusts by a combustion reaction on the combustion catalyst layer 16, and thermal energy is generated by this combustion. This thermal energy passes through the first substrate 11 and heats the interior of the flow path 13 of the first substrate 11. The remaining combustion fluid after the combustion reaction is discharged as a combusted gas to the atmosphere from the outlet port 22 of the fourth substrate 18.

Figure 5:
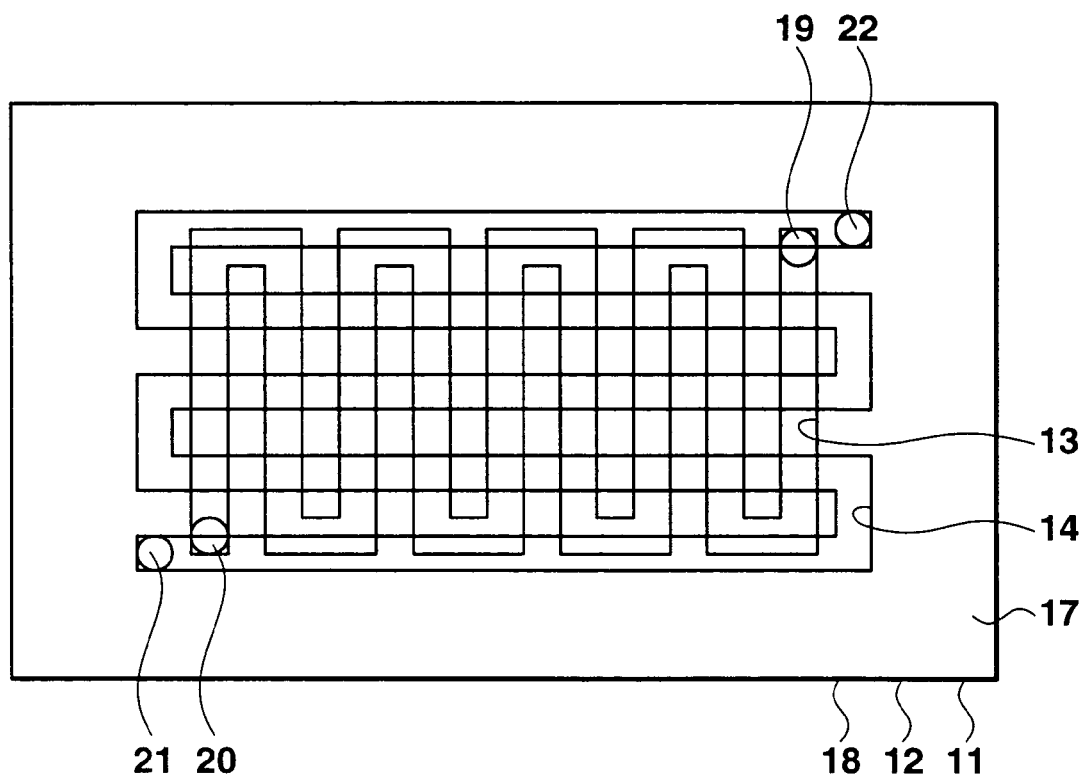
FIG. 5 is an opened-up plan view showing another arrangement of flow paths in the second embodiment of the chemical reaction apparatus according to the present invention.

In the example shown in FIG. 3, the flow path 13 formed in the first substrate 11 and the flow path 14 formed in the second substrate 12 are two-dimensionally identical. However, the arrangement of the first and second flow paths 13 and 14 are not limited to this. FIG. 5 shows another arrangement of the second flow path 14 with respect to the first flow path 13. In this arrangement, the flow paths 13 and 14 are two-dimensionally perpendicular to each other. That is, since the second flow path 14 is formed to heat the interior of the first flow path 13, these two flow paths 13 and 14 are preferably two-dimensionally identical as shown in FIG. 3. However, these flow paths 13 and 14 need only two-dimensionally overlap in many portions, so they need not always be two-dimensionally identical.

A case in which anodic bonding is applied to bond the other surface of the third substrate 17 to one surface of the first substrate 11 will be explained below. First, the third substrate 17 is overlapped on one surface of h first substrate 11, and these first and third substrates 11 and 17 are used as an anode and cathode, respectively. While the first and third substrates 11 and 17 are heated to about 400 to 600° C., a DC voltage of about 1 kV is applied between the two electrodes. Consequently, cations as an impurity in the third substrate 17 move away from the first substrate 11, and a layer having a high oxygen ion concentration appears in that interface of the third substrate 17, which faces the first substrate 11. Accordingly, silicon atoms in that interface of the first substrate 11, which opposes the third substrate 17 and oxygen ions in that interface of the third substrate 17, which opposes the first substrate 11 are bonded, thereby forming a strong bonded interface between the two surfaces.

When the substrates 11 and 17 are heated to a temperature within the range as described above and a DC voltage having the above value is used, the speed at which cations as an impurity in the third substrate 17 move away from the first substrate 11 increases, so these cations can move within a short time period. This shortens the time required for the bonding process. When the first and third substrates 11 and 17 are bonded by anodic bonding as described above, strong bonding can be obtained. In addition, since no adhesive is necessary, no impurity such as an adhesive enters the first flow path 13.

In the above explanation, the first and second substrates 11 and 12 are, e.g., silicon substrates. However, the present invention is not limited to this arrangement. For example, substrates such as glass substrates or aluminum substrates made of a material which can be micropatterned may also be used as these substrates.

Likewise, the third and fourth substrates 17 and 18 are, e.g., glass substrates in the above description, but the present invention is not limited to this arrangement. For example, substrates made of another material such as aluminum may also be used.

In the chemical reaction apparatus of this embodiment as described above, thermal energy required for heating for inducing a desired chemical reaction is obtained by the combustion reaction of a combustion fluid on the combustion catalyst layer. This obviates the need to supply electric power for heating. In addition, a lid is bonded to the flow path having the combustion catalyst layer serving as a heat source for heating, so this flow path is not exposed. Since this suppresses radiation of heat from the flow path to the outside, the energy utilization can be increased. Accordingly, it is possible to simplify an apparatus using this chemical reaction apparatus, and make the apparatus compact and low-cost.

Figure 6:
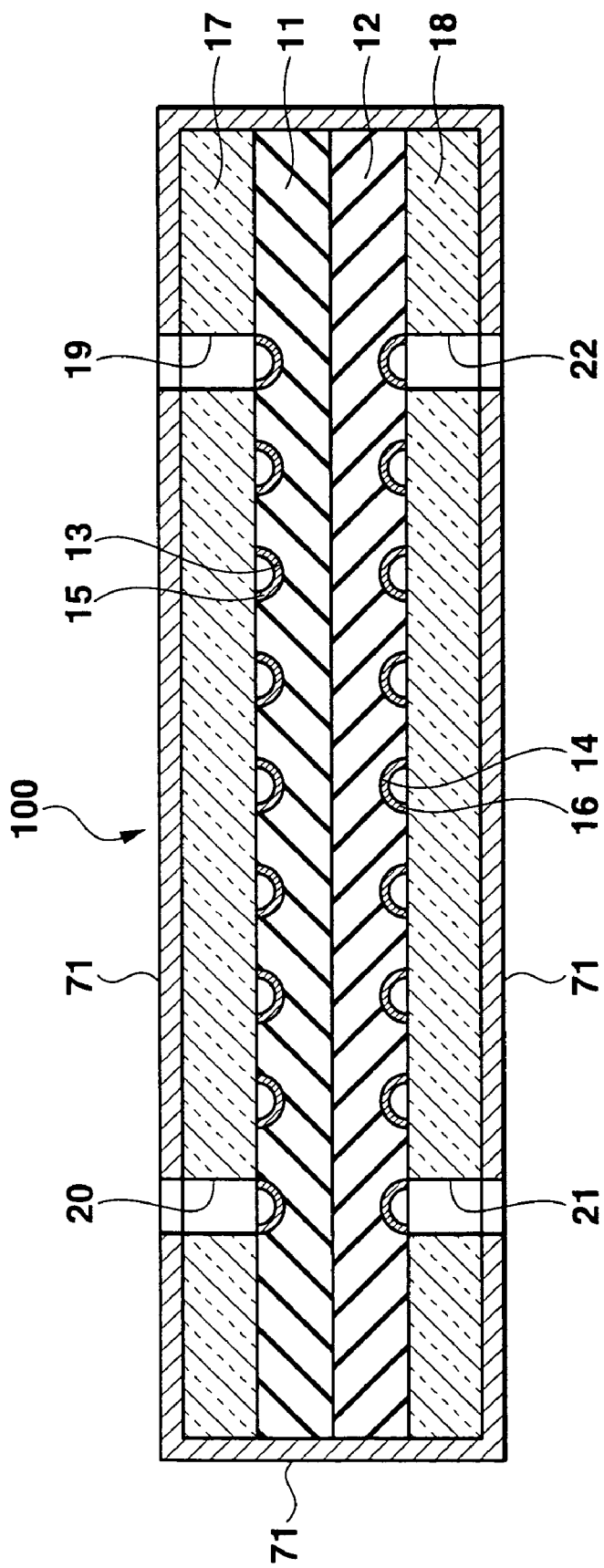
FIG. 6 is a sectional view showing a modification of the chemical reaction apparatus according to the present invention.

FIG. 6 is a modification of the chemical reaction apparatus 100 of this embodiment. In this apparatus, as shown in FIG. 6, a heat radiation preventing film 71 is formed on the outer surfaces of third and fourth substrates 17 and 18 and on the side surfaces of a main substrate 11 and combustion substrate 12, except for the openings of an inlet port 19 and outlet port 20 of the third substrate 17, and the openings of an inlet port 21 and outlet port 22 of the fourth substrate 18, thereby covering the outer surfaces of the chemical reaction apparatus with the heat radiation preventing film 71. As the heat radiation preventing film 71, it is possible to apply a film made of a metal material, such as Au, Al, or Ag, having high heat ray reflectance, or a film made of a metal oxide such as $SnO_2$, $InO_3$, or ZnO. As a method of forming this heat radiation preventing film, it is possible to apply: a method in which a foil-like member or film-like member of the metal material described above is coated with the metal oxide described above, or a film of the metal oxide is formed on the member, and the resultant film is adhered to the outer surfaces of each substrate; a method in which a thin film of any of the above materials is formed on the outer surfaces of each substrate by using a thin film formation technique such as deposition, sputtering, or plating; or a method in which a film is formed by coating the outer surfaces of each substrate with fine grains of any of the above materials together with an appropriate solvent.

The heat radiation preventing film 71 suppresses radiation of heat to the outside from the outer surfaces of each substrate of the chemical reaction apparatus 100. This makes it possible to reduce the thermal energy loss, increase the energy utilization, and downsize the chemical reaction apparatus.

As shown in FIG. 6, the heat radiation preventing film 71 preferably covers the outer exposed surfaces of all the substrates, i.e., substantially all the surrounding surfaces (except for the openings of the inlet and outlet ports) of the chemical reaction apparatus. However, the present invention is not limited to this form, so these films may also be partially formed as needed. For example, since the area of the side surfaces of each substrate is much smaller than that of all the outer surfaces, the heat radiation preventing film 71 may also be formed on the outer surfaces except for these side surfaces of each substrate.

Figure 7:
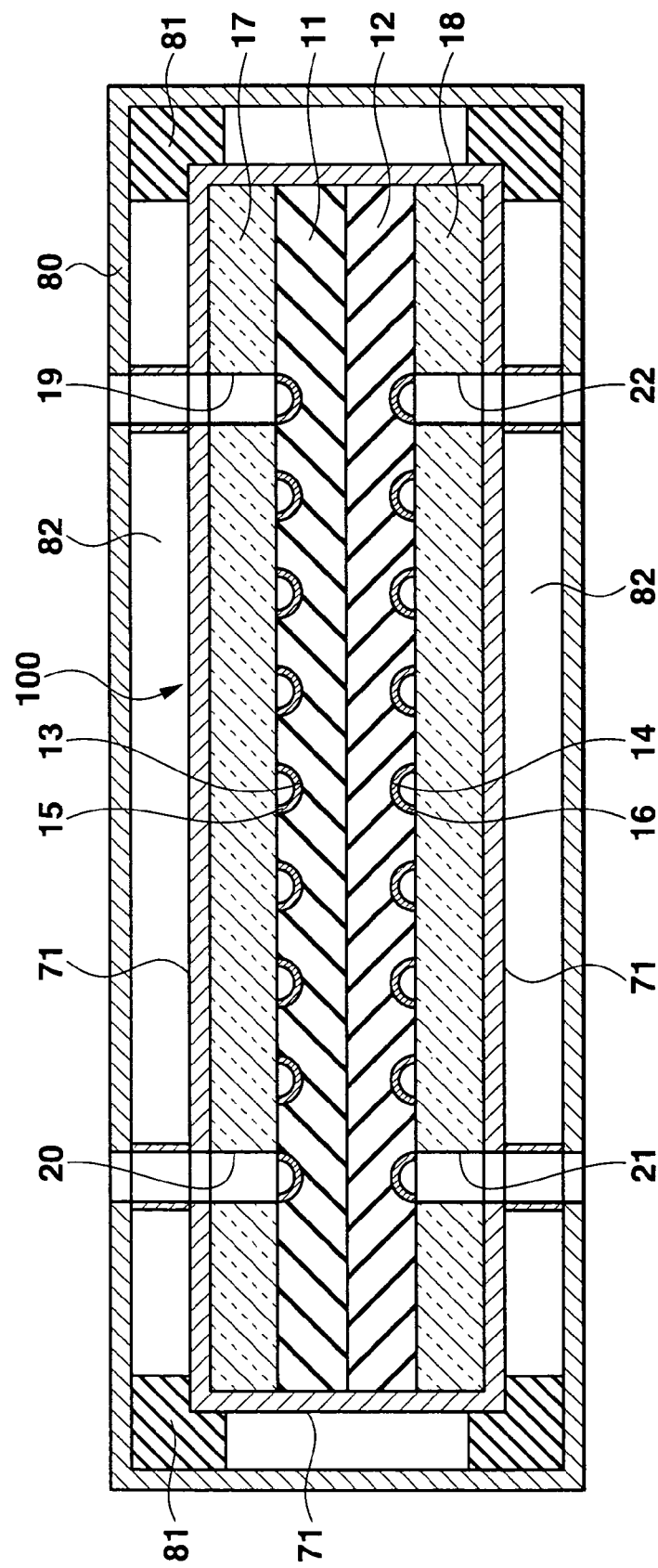
FIG. 7 is a sectional view showing the state in which the chemical reaction apparatus according to the present invention is packaged.

FIG. 7 shows an example of the packaged state when the chemical reaction apparatus 100 according to this embodiment is applied to an arbitrary system, e.g., a power supply system using a fuel cell to be described later. The chemical reaction apparatus 100 is packaged inside a support member 80 (e.g., a housing or mounting frame) via supporting materials 81. The supporting materials 81 are formed in, e.g., the four, upper and lower corners of the chemical reaction apparatus 100. Accordingly, a space or spaces 82 are formed between the support member 80 and chemical reaction apparatus 100 except for portions of the supporting materials 81. The space 82 is a heat-insulating space. The heat-insulating performance may be improved by sealing is a gas, such as air, freon, or carbonic acid gas, having thermal conductivity lower than that of components of the support member 80. The heat-insulating performance may also be further improved by setting a substantially vacuum state. Consequently, it is possible to suppress the thermal energy loss caused if the thermal energy partially leaks by heat conduction to the surrounding support member 80 from the heat radiation preventing film 71 formed on the surrounding surfaces of the chemical reaction apparatus 100. Accordingly, the energy utilization can be further increased, and the chemical reaction apparatus can be further downsized.

The inner and/or outer surface of the box 40 may be covered with a radiation preventing film or layer for reflecting heat (infrared light) outwardly radiated from the apparatus 100 so that outwardly escaping of heat energy, that is, heat loss may be prevented or decreased.

It can be understood that the arrangement shown in FIG. 6 in which the outer surfaces of the chemical reaction apparatus are covered with the heat radiation preventing film, or the arrangement shown in FIG. 7 in which the heat-insulating space is formed around the chemical reaction apparatus is applicable not only to the chemical reaction apparatus of the second embodiment, but also to chemical reaction apparatuses of individual embodiments to be described below.

Third Embodiment

Figure 8:
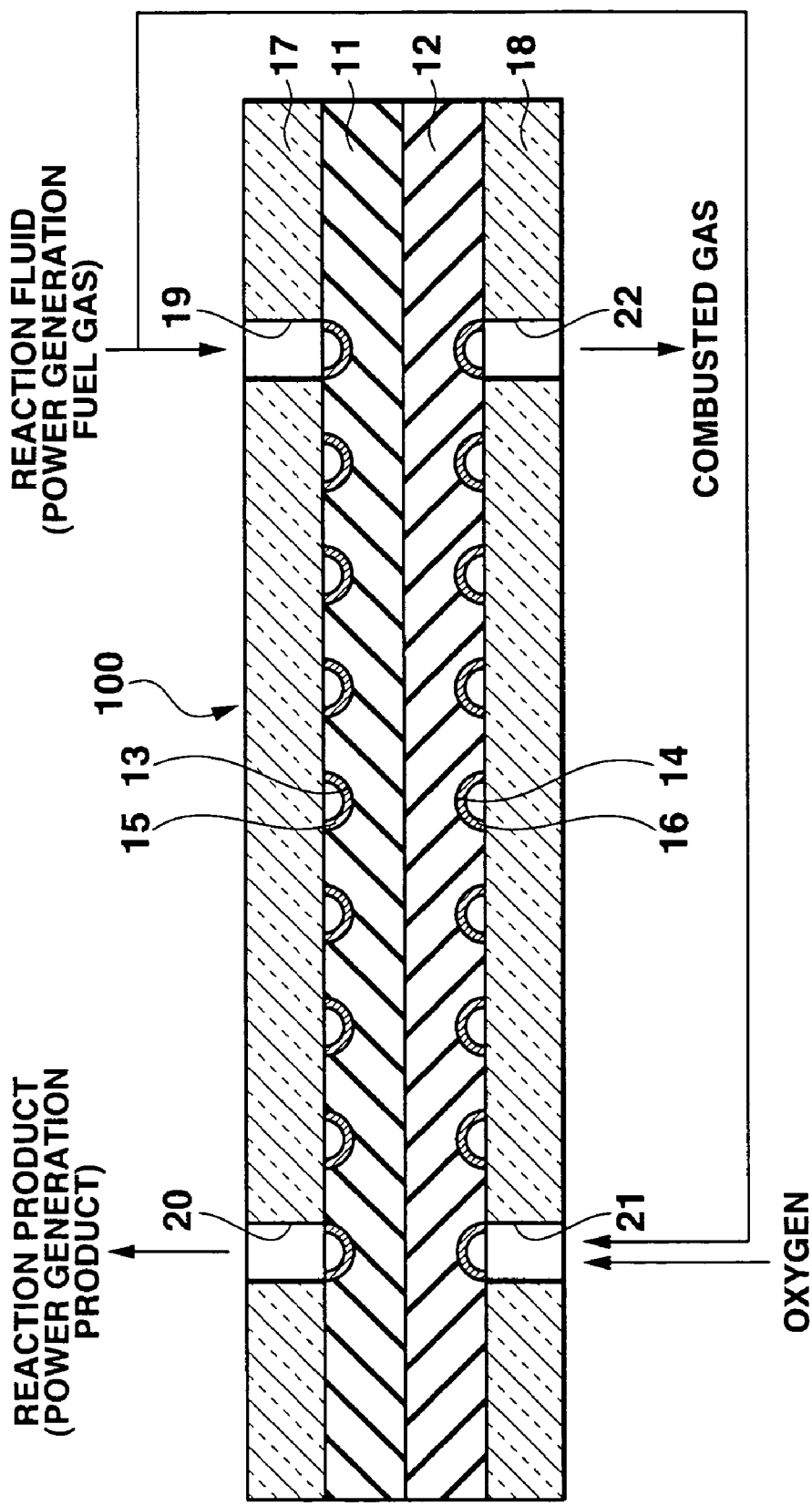
FIG. 8 is a sectional view of the third embodiment of the chemical reaction apparatus according to the present invention.

FIG. 8 is a sectional view showing an apparatus as the third embodiment of a chemical reaction apparatus 100 according to the present invention.

In the third embodiment, if a reaction fluid supplied into a first flow path 13 of a first substrate 11 contains a combustible component, this reaction fluid is supplied to an inlet port 19 of a third substrate 17. In addition, this reaction fluid and oxygen taken from the atmosphere are supplied as a combustion fluid to an inlet port 21 of a fourth substrate 18.

For example, when the chemical reaction apparatus 100 is applied to a reforming unit of a power supply system using a fuel cell to be described later and a power generation fuel gas formed by vaporizing an aqueous solution of methanol ($CH_3OH+H_2O$) is supplied as a reaction fluid, this power generation fuel gas contains a combustible component (hydrogen), so the arrangement of the third embodiment is suitably applicable. Consequently, the power generation fuel gas can be supplied to the inlet port 19 of the third substrate 17, and this power generation fuel gas and oxygen taken from the atmosphere can be supplied to the inlet port 21 of the fourth substrate 18.

The arrangement of the third embodiment has the same effects as the second embodiment. In addition, unlike in the arrangement of the second embodiment, it is unnecessary to separately supply a combustion gas, and this obviates the need for an arrangement for supplying a combustion gas. Accordingly, it is possible to further simplify an apparatus using the chemical reaction apparatus 100, and make the apparatus compact and low-cost.

Fourth Embodiment

Figure 9:
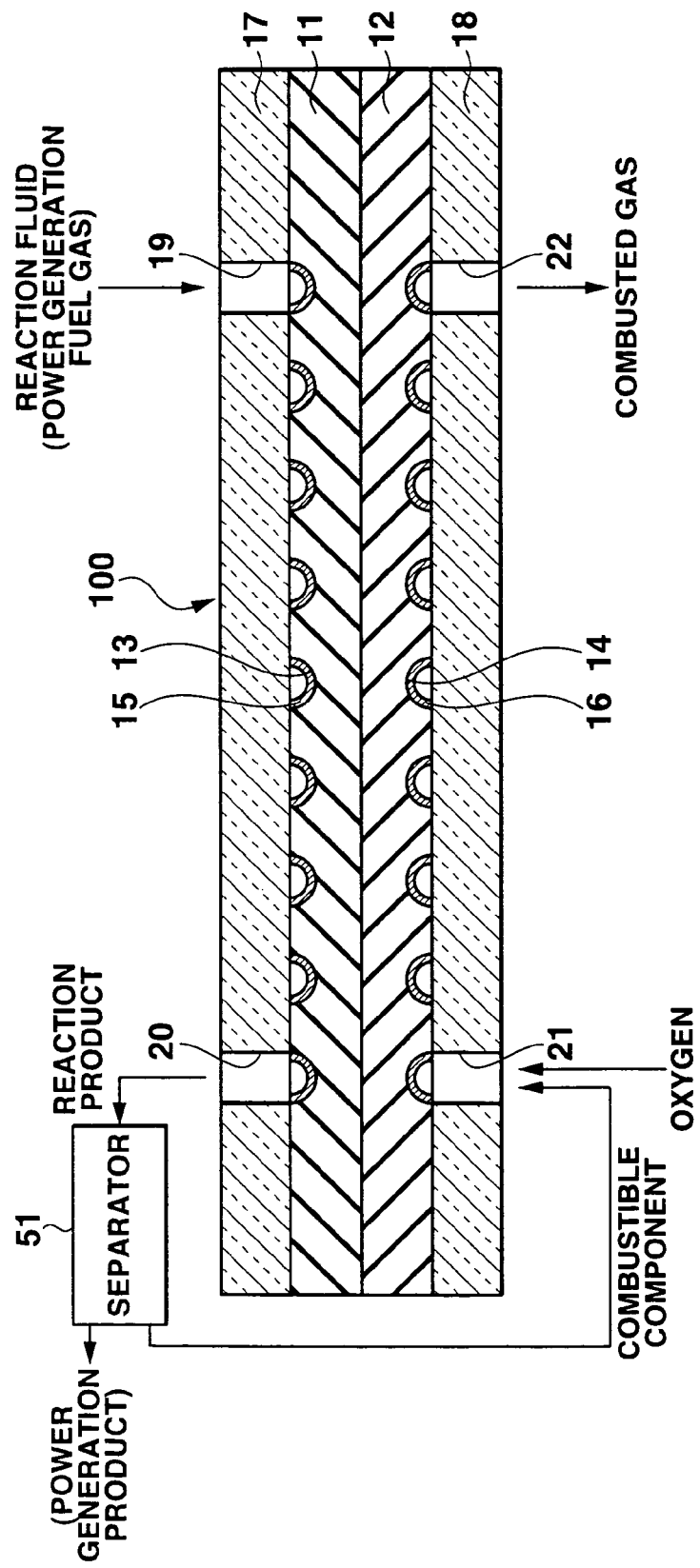
FIG. 9 is a sectional view of the fourth embodiment of the chemical reaction apparatus according to the present invention.

FIG. 9 is a sectional view, similar to FIG. 2, showing an apparatus as the fourth embodiment of a chemical reaction apparatus 100 according to the present invention.

In the fourth embodiment, a separator 51 which separates a combustible component from a reaction product is installed outside substrates. In this apparatus, if a reaction product discharged from an outlet port 20 of a third substrate 17 contains a combustible component, this reaction product is supplied to the separator 51, and the separator 51 separates the reaction product to be originally extracted and the combustible component. This separated combustible component and oxygen taken from the atmosphere are supplied as a combustion fluid to an inlet port 21 of a fourth substrate 18.

For example, when the chemical reaction apparatus 100 is applied to a reforming unit of a power supply system using a fuel cell to be described later and a reaction product discharged from the outlet port 20 of the third substrate 17 contains, e.g., an unreacted power generation fuel as a combustible component, this reaction product is supplied to the separator 51, and the separator 51 separates hydrogen as a power generation product to be originally extracted and the combustible component. This separated combustible component and oxygen taken from the atmosphere are supplied as a combustion fluid to the inlet port 21 of the fourth substrate 18.

If one of the power generation product to be extracted and the combustible component liquefies at room temperature or more and their boiling points have a difference, liquefaction separation can be used as a method of separation in the separator 51. Alternatively, it is also possible to use a separation method using a separation film such as a film having selective transmittance, e.g., a Pb film which selectively transmits $H_2$.

The arrangement of the fourth embodiment also has the same effects as the second embodiment. In addition, as in the third embodiment, no combustion gas need be supplied, so no arrangement for supplying a combustion gas is necessary. Therefore, an apparatus using the chemical reaction apparatus 100 can be made compact and low-cost.

Fifth Embodiment

Figure 10:
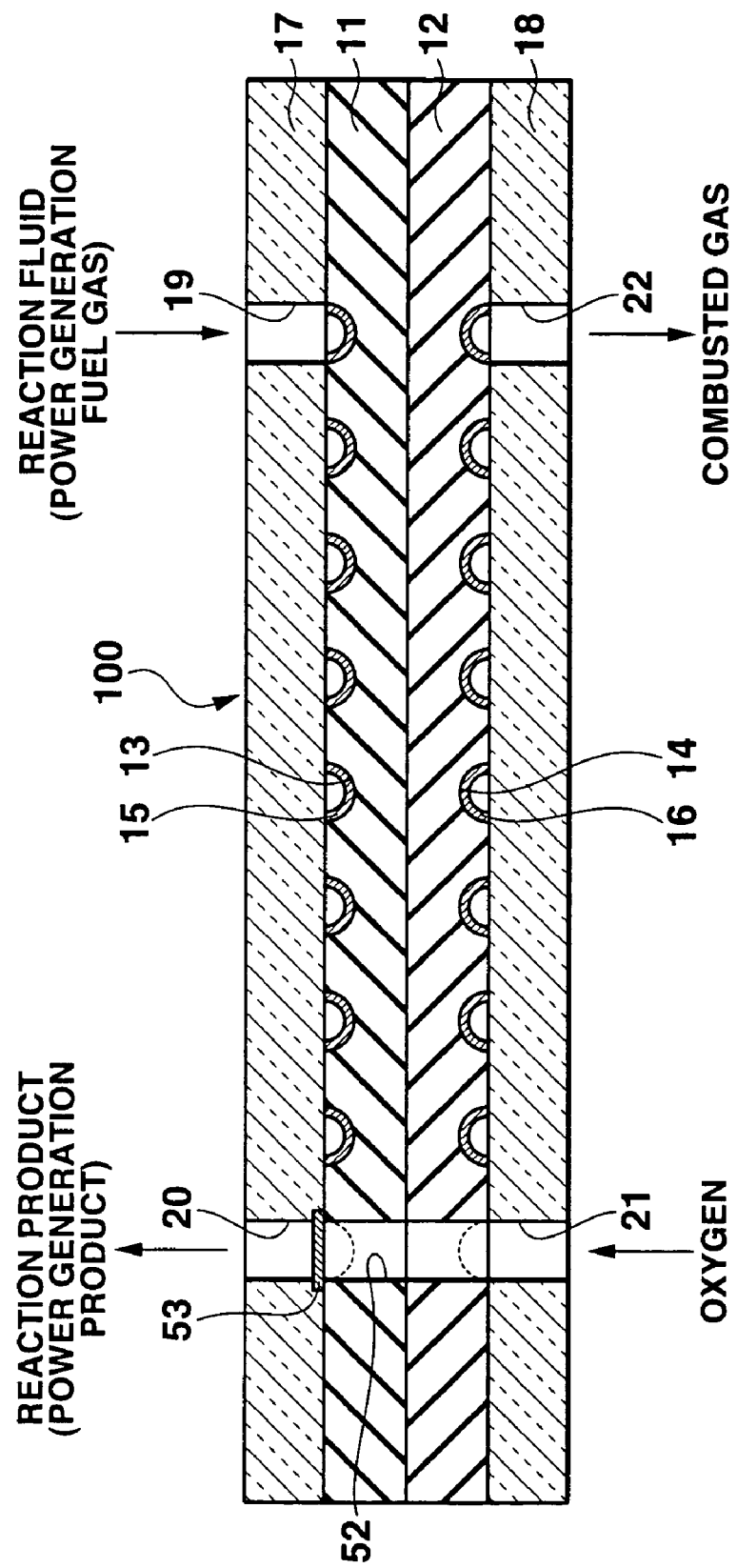
FIG. 10 is a sectional view of the fifth embodiment of the chemical reaction apparatus according to the present invention.

FIG. 10 is a sectional view, similar to FIG. 2, showing an apparatus as the fifth embodiment of a chemical reaction apparatus 100 according to the present invention.

The fifth embodiment includes a separation film 53 formed between a flow path 13 of a first substrate 11 and an outlet port 20 of a third substrate 17, and a communication hole 52 which is formed in the first substrate 11 and a second substrate 12 between the outlet port 20 of the flow path 13 of the first substrate 11 and an inlet port 21 of a flow path 14 of the second substrate 12, and which allows these ports 20 and 21 to communicate with each other.

The separation film 53 has a function of separating a combustible component from a reaction product. For example, the separation film 53 is a Pb film which selectively transmits hydrogen $H_2$.

Of the reaction products from the flow path 13 of the first substrate 11, a component such as hydrogen transmitted through the separation film 53 is discharged from the outlet port 20 of the third substrate 17, and a combustible component not transmitted through the separation film 53 is introduced into the communication hole 52. This combustible component is introduced into the inlet port 21 of the flow path 14 of the second substrate 12, and mixed with oxygen taken from the atmosphere through the inlet port 21 of a fourth substrate 18. The mixture is supplied as a combustion fluid to the flow path 14.

For example, when the chemical reaction apparatus 100 is applied to a reforming unit of a power supply system using a fuel cell to be described later, at the entrance of the outlet port 20 of the first flow path 13, hydrogen of the power generation product is transmitted through the separation film 53, so this hydrogen is discharged from the outlet port 20. A component of the power generation product except for hydrogen is not transmitted through the separation film 53 but introduced into the communication hole 52 and then to the exit of the inlet port 21 of the second flow path 14. This component is mixed with oxygen taken from the atmosphere through the inlet port 21 of the fourth substrate 18, thereby forming a combustion fluid.

It can be understood that the arrangement of the fifth embodiment uses the separation film 53 instead of the separator 51 of the fourth embodiment shown in FIG. 9. Therefore, the arrangement of the fifth embodiment also has the same effects as the second embodiment. In addition, as in the third embodiment, no combustion gas need be supplied, so no arrangement for supplying a combustion gas is necessary. Furthermore, the separator 51 in the arrangement of the fourth embodiment is unnecessary. Since this further simplifies the apparatus, the apparatus can be made more compact and low-cost.

Sixth Embodiment

Figure 11:
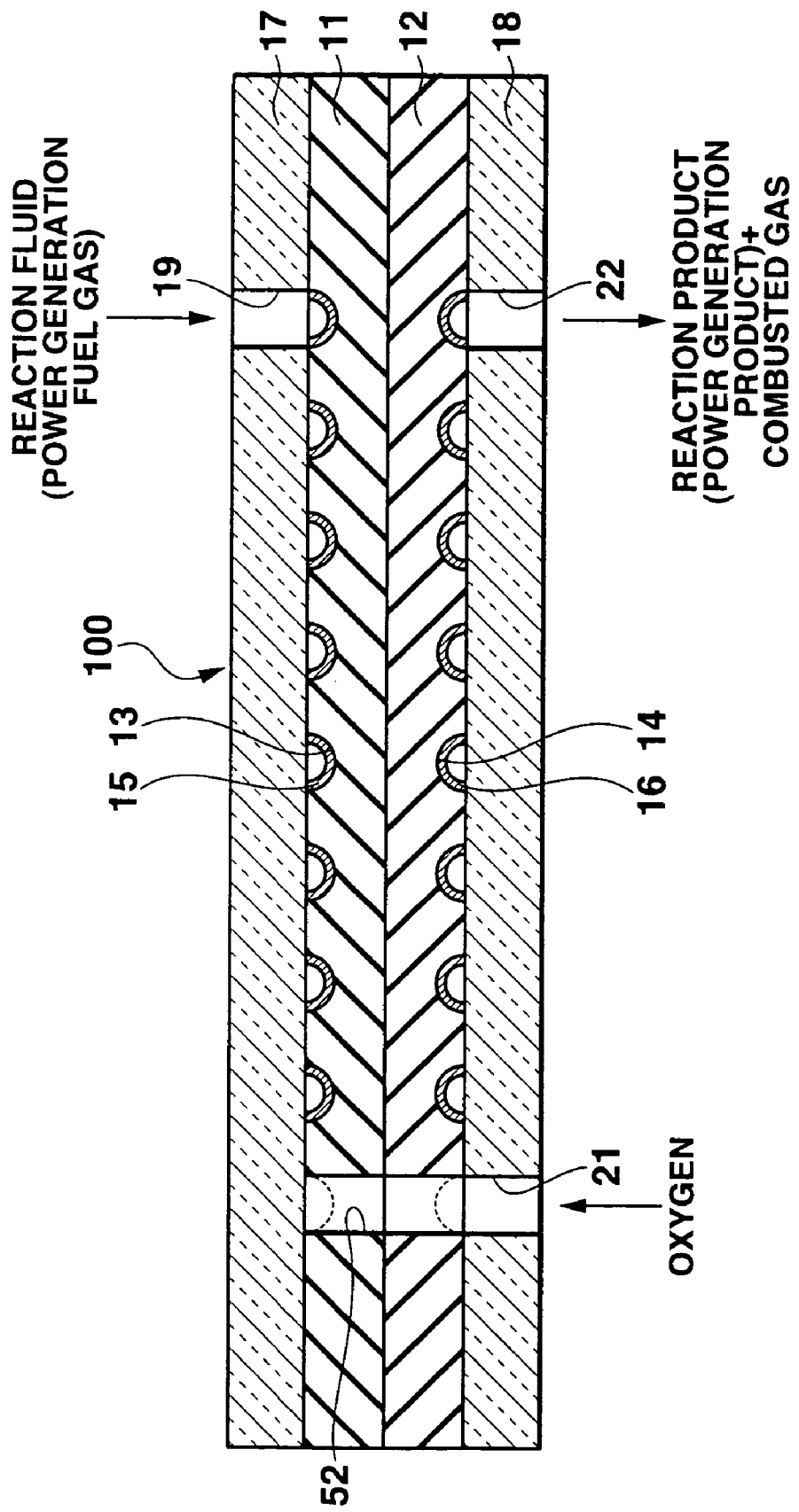
FIG. 11 is a sectional view of the sixth embodiment of the chemical reaction apparatus according to the present invention.

FIG. 11 is a sectional view, similar to FIG. 2, showing an apparatus as the sixth embodiment of a chemical reaction apparatus 100 according to the present invention.

Similar to the arrangement of the fifth embodiment shown in FIG. 10, the sixth embodiment includes a communication hole 52 formed between an outlet port 20 of a flow path 13 of a first substrate 11 and an inlet port 21 of a flow path 14 of a second substrate 12. However, the sixth embodiment does not include the outlet port 20 of a third substrate 17 and the separation film 53 shown in FIG. 10.

In this apparatus, when a reaction product is introduced to the inlet port 21 of the flow path 14 of the second substrate 12 from the flow path 13 of the first substrate 11 through the communication hole 52 and this reaction product contains a combustible component, the reaction product and oxygen taken from the atmosphere through the inlet port 21 of a fourth substrate 18 are supplied as a combustion fluid to the flow path 14. Of the reaction product, the combustible component combusts by a combustion reaction on a combustion catalyst layer 16. The rest of the reaction product and the combusted gas are discharged from an outlet port 22 of the fourth substrate 18.

For example, when the chemical reaction apparatus 100 is applied to a reforming unit of a power supply system using a fuel cell to be described later, a power generation product is introduced from the flow path 13 of the first substrate 11 to the inlet port 21 of the flow path 14 of the fourth substrate 18 through the communication hole 52, and this power generation product contains, e.g., an unreacted power generation fuel as a combustible component, a portion of this power generation product and oxygen taken from the atmosphere through the inlet port 21 of the fourth substrate 18 combust by a combustion reaction on the combustion catalyst layer 16, and the power generation product and the combusted gas are discharged from the outlet port 22 of the fourth substrate 18. Of this discharged fluid, at least the combusted gas is separated and discharged to the atmosphere.

Accordingly, the arrangement of the sixth embodiment also has the same effects as the second embodiment. In addition, as in the third embodiment, no combustion gas need be supplied, so no arrangement for supplying a combustion gas is necessary. Furthermore, the separation film 53 in the arrangement of the fifth embodiment is unnecessary. Since this further simplifies the apparatus, the apparatus can be made more-compact and low-cost.

Seventh Embodiment

Figure 12:
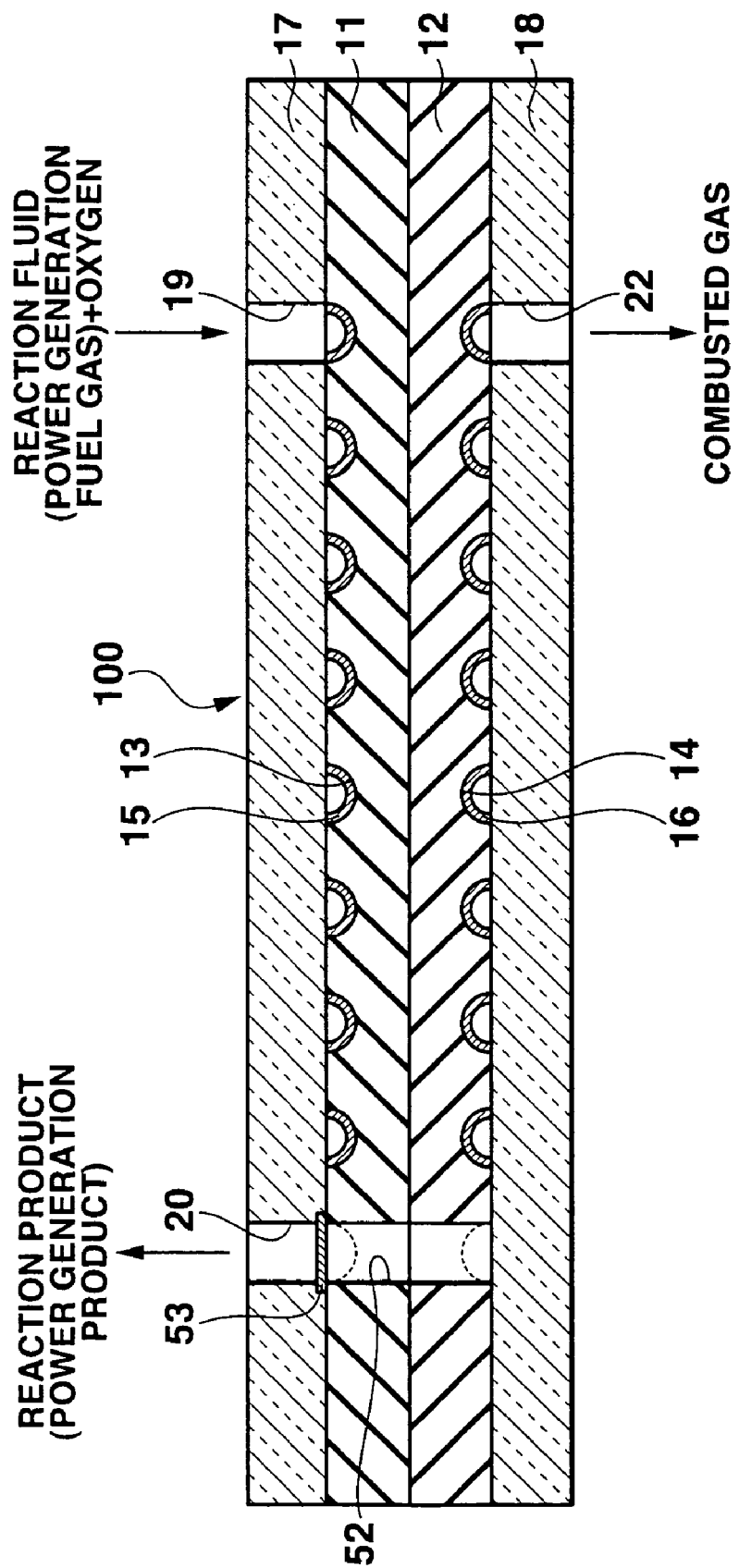
FIG. 12 is a sectional view of the seventh embodiment of the chemical reaction apparatus according to the present invention.

FIG. 12 is a sectional view, similar to FIG. 2, showing an apparatus as the seventh embodiment of a chemical reaction apparatus 100 according to the present invention.

Analogous to the arrangement of the fifth embodiment shown in FIG. 10, the seventh embodiment includes a separation film 53 formed on that side of an outlet port 20 of a flow path 13 of a first substrate 11, which faces a third substrate 17, and a communication port 52 formed between the outlet port 20 of the flow path 13 of the first substrate 11 and an inlet port 21 of a flow path 14 of a second substrate 12. However, the seventh embodiment does not include the inlet port 21 of a fourth substrate 18. As in the fifth embodiment, the separation film 53 has a function of separating a combustible component from a reaction product. For example, the separation film 53 is a Pb film which selectively transmits $H_2$.

In this apparatus, a reaction fluid and oxygen taken from the atmosphere are supplied to an inlet port 19 of the third substrate 17. Of the reaction product, a component such as hydrogen transmitted through the separation film 53 is discharged from the outlet port 20 of the third substrate 17, and a combustible component not transmitted through the separation film 53 is introduced into the communication hole 52 and then to the flow path 14 of the second substrate 12.

For example, when the chemical reaction apparatus 100 is applied to a reforming unit of a power supply system using a fuel cell to be described later, a power generation combustion gas and oxygen taken from the atmosphere are supplied to the inlet port 19 of the third substrate 17. Of the reaction product, hydrogen as a power generation product transmitted through the separation film 53 is discharged from the outlet port 20 of the third substrate 17, and a component except for hydrogen is not transmitted through the separation film 53. This component is introduced into the communication hole 52 and then to the flow path 14 of the second substrate 12 to form a combustion fluid. The combusted gas is discharged from the outlet port 22.

Accordingly, the arrangement of the seventh embodiment also has the same effects as the second embodiment. In addition, as in the third embodiment, no combustion gas need be supplied, so no arrangement for supplying a combustion gas is necessary. Furthermore, the inlet port for taking oxygen from the atmosphere is eliminated from the arrangement of the sixth embodiment, and the inlet port for a reaction fluid is used for the purpose. Since this simplifies the apparatus, the apparatus can be made compact and low-cost.

Eighth Embodiment

Figure 13:
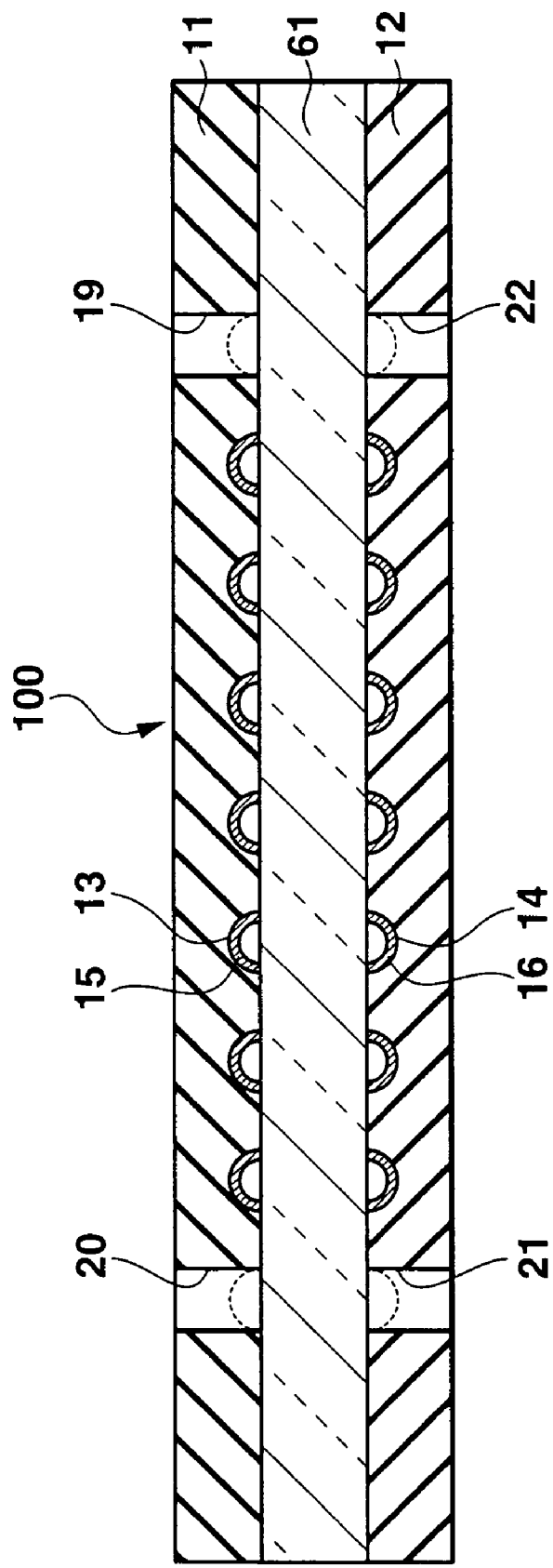
FIG. 13 is a sectional view of the eighth embodiment of the chemical reaction apparatus according to the present invention.

FIG. 13 is a sectional view, similar to FIG. 2, showing an apparatus as the eighth embodiment of a chemical reaction apparatus 100 according to the present invention.

As shown in FIG. 13, similar to each embodiment described above, the chemical reaction apparatus 100 of the eighth embodiment includes a first substrate 11 having a first flow path 13 formed in its lower surface, a second substrate 12 having a second flow path 14 formed in its upper surface, and a fifth substrate 61 such as a glass substrate stacked and bonded between these first and second substrates 11 and 12. The flow path 13 formation surface or lower surface of the first substrate 11 is bonded to one surface or the upper surface of the fifth substrate 61, and the flow path 14 formation surface or upper surface of the second substrate 12 is bonded to the other surface of the fifth substrate 61. In those two predetermined portions of the first substrate 11, which correspond to both end portions of the flow path 13, an inlet port 19 and outlet port 20 open in the upper surface of the substrate 11 are formed. In those two predetermined portions of the second substrate 12, which correspond to both end portions of the flow path 14, an inlet port 21 and outlet port 22 open in the lower surface of the substrate 12 are formed.

In the first to seventh embodiments described above, the chemical reaction apparatus 100 is formed by a four-layered structure. In the eighth embodiment, the chemical reaction apparatus 100 has a three-layered structure. Since this decreases the thickness of the chemical reaction apparatus 100, the thickness of an apparatus using this chemical reaction apparatus can be decreased, so the apparatus can be downsized.

Although the fifth substrate 61 is a glass substrate in the above description, the present invention is not limited to this arrangement. For example, a substrate made of another material such as an aluminum substrate may also be used. In this embodiment, the characteristics of heat conduction from the flow path 14 of the combustion substrate 12 to the flow path 13 of the main substrate 11 can be controlled by changing the material and thickness of the fifth substrate 61. Therefore, the material and thickness of the fifth substrate 61 may be appropriately set in accordance with necessary heat conduction characteristics.

Note that the arrangement of the chemical reaction apparatus 100 having the three-layered structure according to the eighth embodiment may also be applied to the arrangements of the first to seventh embodiments described above.

Next, the ninth to 15th embodiments of a chemical reaction apparatus 100 according to the present invention will be explained below. These embodiments are based on the first to eighth embodiments described above, so the same reference numerals denote parts having the same arrangements, and an explanation thereof will be omitted or simplified.

Ninth Embodiment

Figure 14:
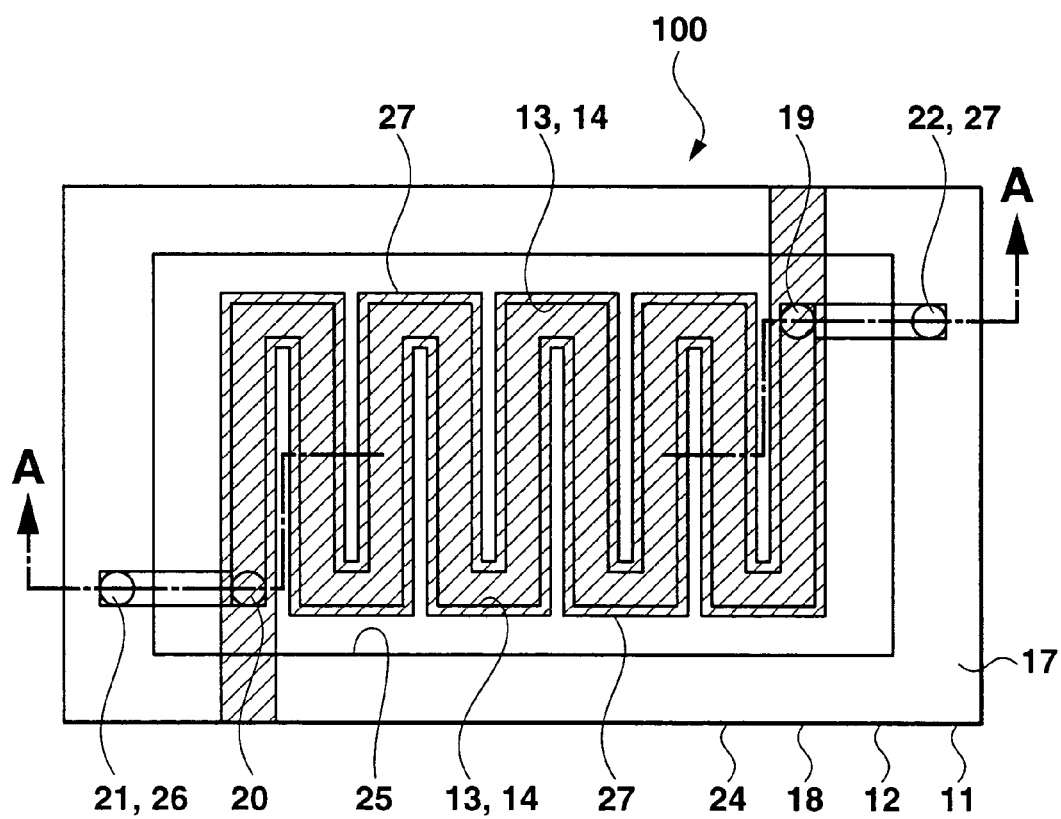
FIG. 14 is an opened-up plan view of the ninth embodiment of the chemical reaction apparatus according to the present invention.
Figure 15:
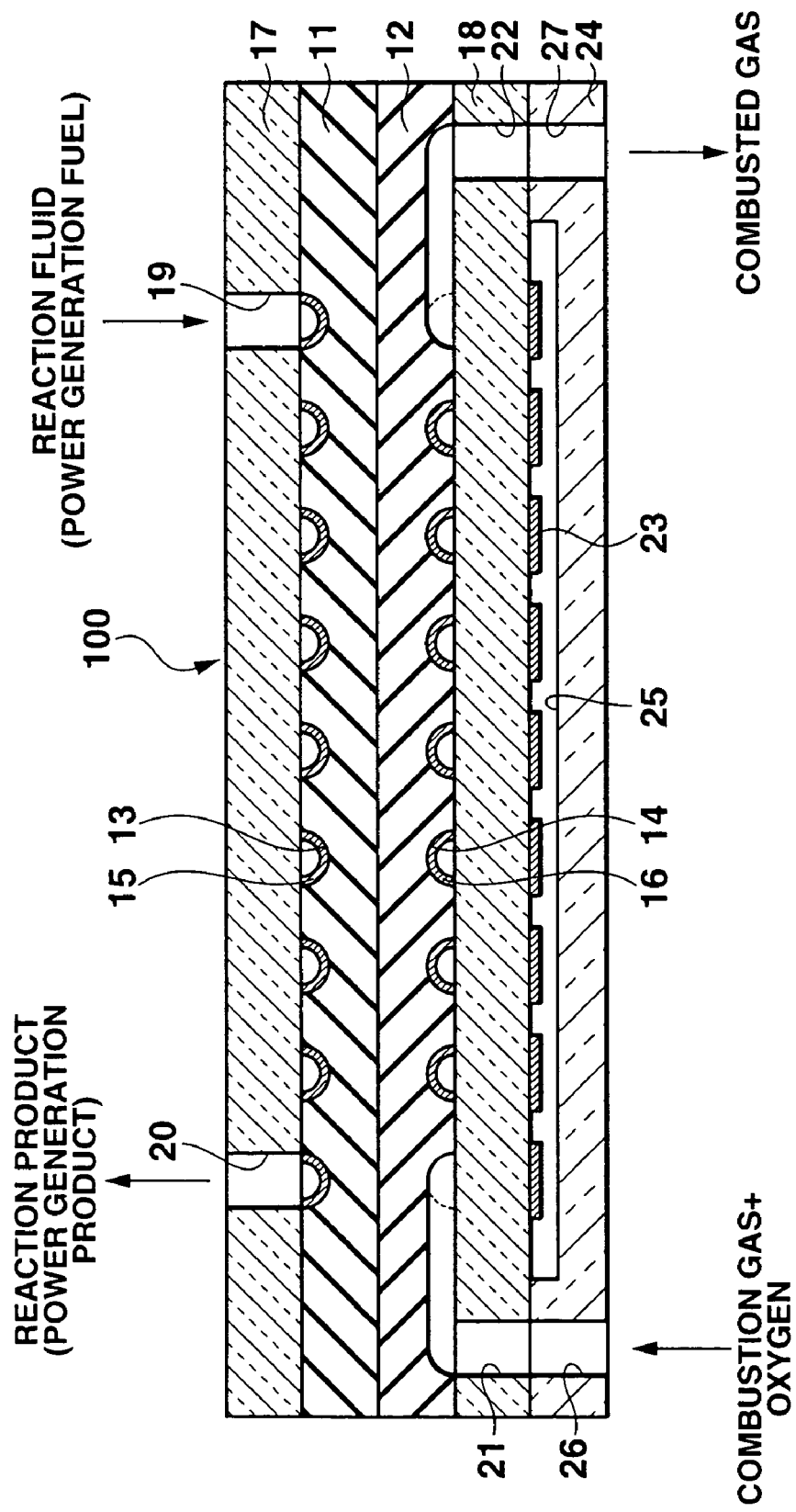
FIG. 15 is a sectional view of the ninth embodiment of the chemical reaction apparatus according to the present invention.

FIG. 14 is an opened-up plan view showing an apparatus as the ninth embodiment of a chemical reaction apparatus 100 according to the present invention. FIG. 15 is a sectional view taken along a line A-A of the chemical reaction apparatus 100.

The chemical reaction apparatus 100 according to the ninth embodiment has the same arrangement as the second embodiment shown in FIGS. 3 and 4, and also includes a heating element which is, e.g., a thin-film heater.

The chemical reaction apparatus 100 according to the ninth embodiment includes first and second substrates 11 and 12, e.g., silicon substrates adjacent to each other and having fine zigzagged flow paths 13 and 14, respectively, formed in them, third and fourth substrates 17 and 18, e.g., glass substrates adhered (bonded) to the flow path formation surfaces of the first and second substrates 11 and 12, respectively, by anodic bonding or the like, a reaction catalyst layer 15 formed in at least a portion of the inner wall surface of the flow path 13 of the first substrate 11, a combustion catalyst layer 16 formed in at least a portion of the inner wall surface of the flow path 14 of the second substrate 12, an inlet port 19 and outlet port 20 formed in those two predetermined portions of the third substrate 17, which correspond to the two end portions of the flow path 13, and an inlet port 21 and outlet port 22 formed in those two predetermined portions of the fourth substrate 18, which correspond to the two end portions of the flow path 14. In addition, this apparatus has a thin-film heater 23 formed on the other surface or lower surface of the fourth substrate 18, and a sixth substrate 24, e.g., a glass plate about 0.7 mm thick having a peripheral portion adhered to the lower surface of the fourth substrate 18 and having a recess 25 formed in a region corresponding to the thin-film heater 23. In those two predetermined portions of the sixth substrate 24, which correspond to the inlet port 21 and outlet port 22 of the fourth substrate 18, an inlet port 26 and outlet port 27 open in the lower surface of the substrate 24 are formed.

In the chemical reaction apparatus 100, as in the second embodiment, a reaction fluid is supplied into the flow path 13 of the first substrate 11 through the inlet port 19 of the third substrate 17, a desired chemical reaction is induced in the flow path 13 by heating the flow path 13, and the reaction product is discharged from the outlet port 20 of the third substrate 17. A combustion fluid consisting of a combustion gas, e.g., hydrogen and oxygen (air) taken from the atmosphere is supplied into the flow path 14 of the second substrate 12 through the inlet port 26 of the sixth substrate 24 and the inlet port 21 of the fourth substrate 18. The supplied combustion fluid combusts on the combustion catalyst layer 16 by a combustion reaction, thereby generating thermal energy. The residual combustion fluid after the combustion reaction is discharged as a combusted gas to the atmosphere through the outlet port 22 of the fourth substrate 18 and the outlet port 27 of the sixth substrate 24.

The thin-film heater 23 is a resistor made of, e.g., $TaSiO_x$ or $TaSiO_xN$. This thin resistor film is formed by sputtering or the like. As shown in FIG. 12, the thin-film heater 23 may have a shape corresponding to the zigzagged flow paths 13 and 14, a rectangular shape which covers the whole flow paths 13 and 14, or some other shape. The thin-film heater 23 controls the internal heating temperature of the flow path 13 of the first substrate 11.

In addition to protection of the thin-film heater 23, the sixth substrate 24 prevents diffusion of heat from the thin-film heater 23 to the outside by the heat-insulating effect of the recess 25, thereby increasing the heating efficiency. To this end, the heat-insulating performance may be improved by sealing, in the recess 25, a gas such as air, freon, or carbonic acid gas having lower thermal conductivity than that of the sixth substrate 24. The heat-insulating performance may also be further improved by setting a substantially vacuum state in the recess 25.

As an element for heating the interior of the flow path 13 of the first substrate 11, the chemical reaction apparatus 100 according to the ninth embodiment includes, as in the second embodiment, the means which supplies a combustion fluid to the flow path 14 of the second substrate 12, and heats by thermal energy generated by the combustion reaction by the combustion catalyst layer 16, and also includes the means which heats by heat generated by supplying predetermined electric power to the thin-film heater 23. The means which heats by the thermal energy generated by the combustion reaction is used as a main heating element, and the heating element using the thin-film heater is used as an auxiliary means. This arrangement can reduce the electric power supplied to the thin-film heater, compared to the conventional arrangement which heats by only the thin-film heater.

When only the heating element using the combustion reaction is used as the heating element, it is difficult to perform, e.g., precise temperature control or temperature control having high response corresponding to the situation. In contrast, this embodiment which additionally uses the heating element using the thin-film heater can perform rough heating by the heating element using the combustion reaction and precise temperature control by the thin-film heater. This makes it possible to reduce power consumption by the thin-film heater and achieve precise temperature control. Accordingly, a temperature necessary for a desired chemical reaction can be accurately set, so the chemical reaction can be efficiently performed. For example, when the chemical reaction apparatus of this embodiment is applied to a power supply system using a fuel cell to be described later, the power generation efficiency can be increased.

Although the sixth substrate 24 is, e.g., a glass substrate in the above description, the present invention is not limited to this material. For example, the material is properly selected in accordance with necessary heat-insulating characteristics. As an example, an aluminum substrate may also be used.

In the apparatus shown in FIG. 15, the thin-film heater 23 is formed on the lower surface of the fourth substrate 18. However, the present invention is not limited to this arrangement, and the thin-film heater 23 may also be formed on the outer surface of the third substrate 17. In this case, a substrate analogous to the sixth substrate 24 may be formed on the outer surface of the third substrate 17.

Furthermore, thin-film heaters 23 may also be formed on the outer surfaces of both the third and fourth substrates 17 and 18. In this case, substrates similar to the sixth substrate 24 may be formed on the outer surfaces of both the third and fourth substrates 17 and 18.

It can be understood that these modifications of arrangements of the thin-film heater 23 and sixth substrate 24 are applicable not only to the chemical reaction apparatus of the ninth embodiment but also to chemical reaction apparatuses of embodiments to be described below.

(10th Embodiment)

Figure 16:
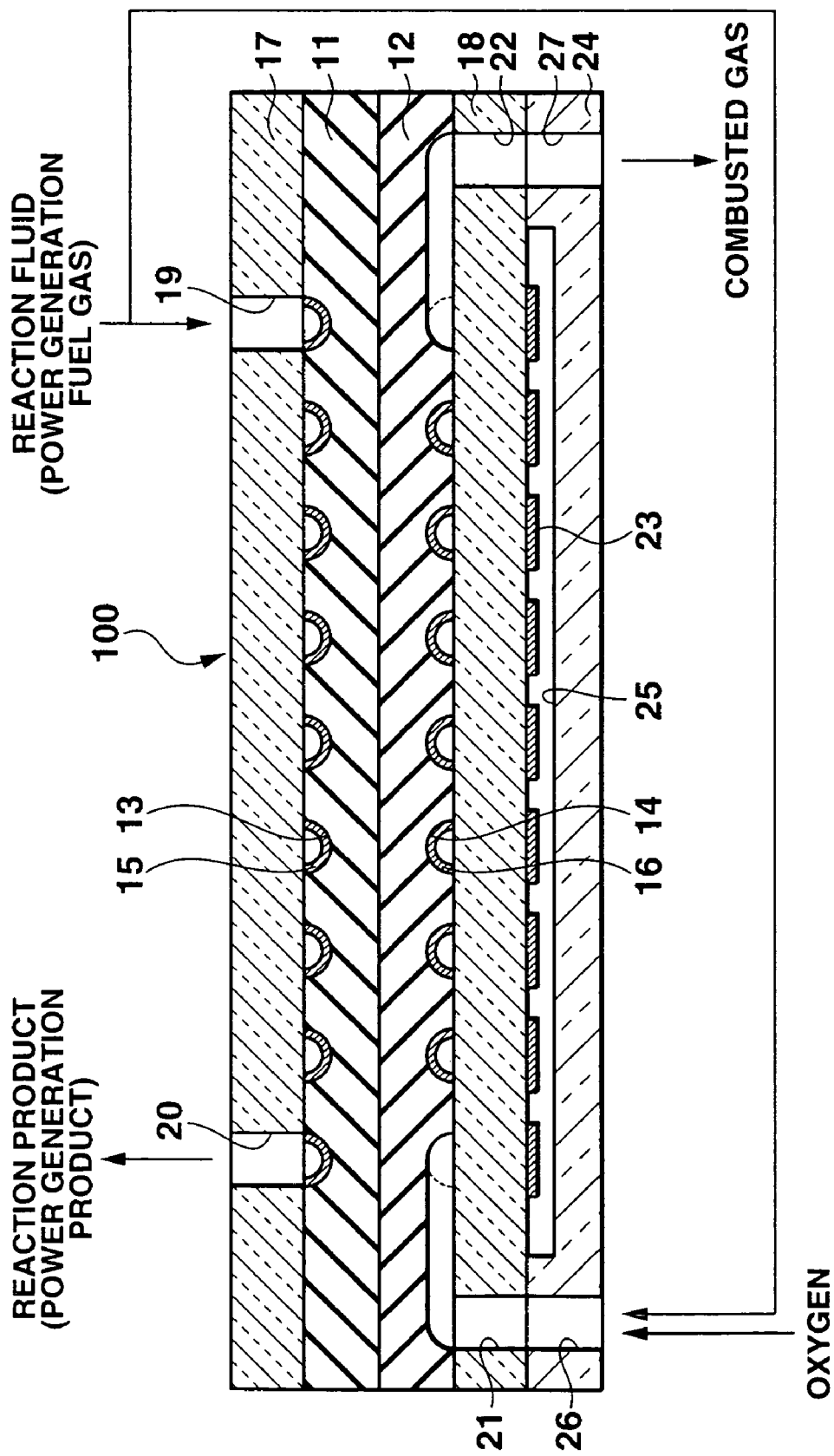
FIG. 16 is a sectional view of the 10th embodiment of the chemical reaction apparatus according to the present invention.

FIG. 16 is a sectional view, similar to FIG. 2, showing an apparatus as the 10th embodiment of a chemical reaction apparatus 100 according to the present invention.

The 10th embodiment includes the thin-film heater 23 of the ninth embodiment in addition to the arrangement of the third embodiment shown in FIG. 8.

In the apparatus of the 10th embodiment, a reaction fluid is supplied to an inlet port 19 of a third substrate 17, and this reaction fluid and oxygen taken from the atmosphere are supplied as a combustion fluid to an inlet port 26 of a sixth substrate 24. As a consequence, this arrangement has the same effects as the ninth embodiment. In addition, since no combustion gas need be supplied, an arrangement for supplying a combustion gas is unnecessary. Accordingly, an apparatus using the chemical reaction apparatus 100 can be made compact and low-cost.

(11th Embodiment)

Figure 17:
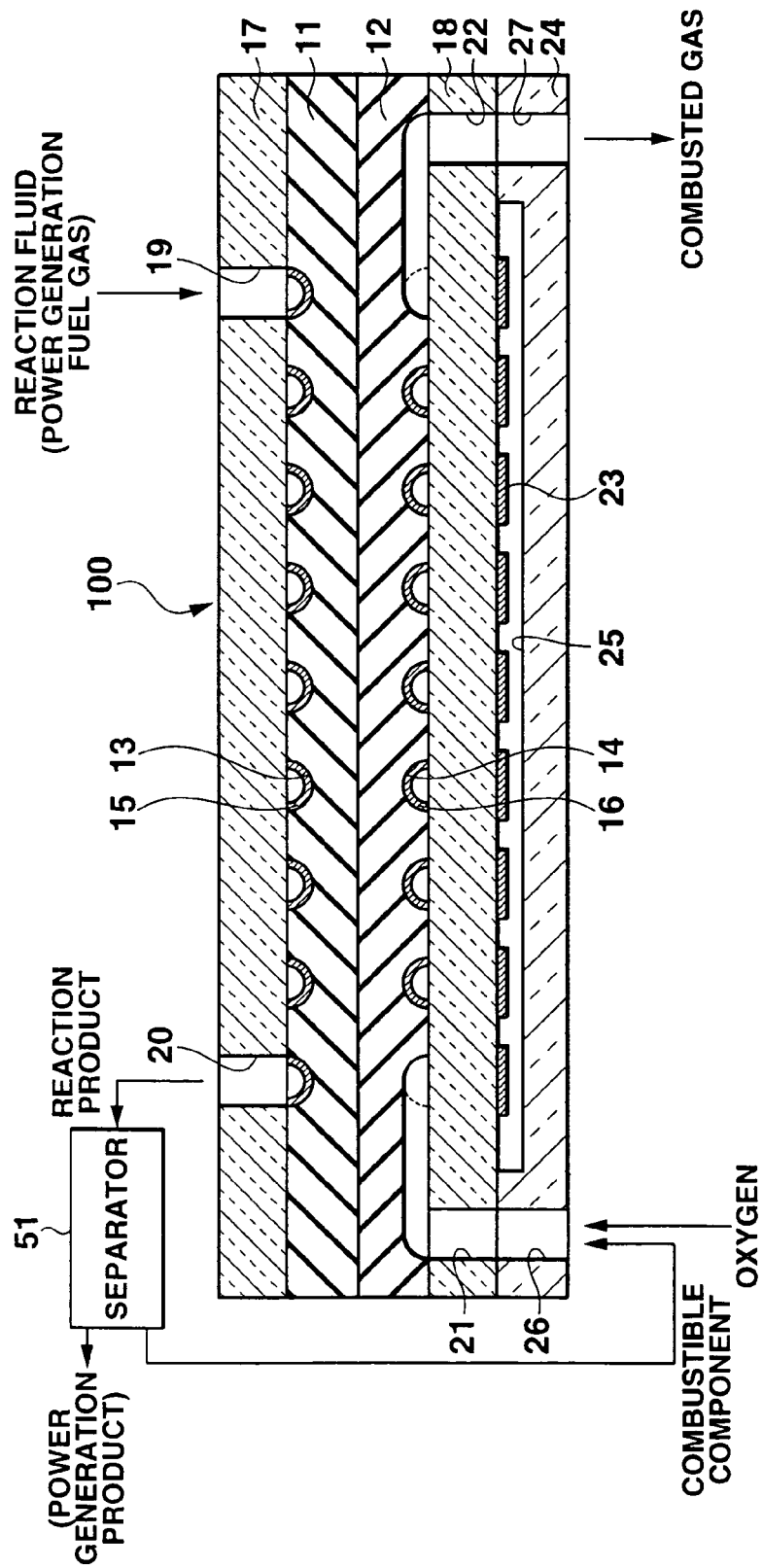
FIG. 17 is a sectional view of the 11th embodiment of the chemical reaction apparatus according to the present invention.

FIG. 17 is a sectional view, similar to FIG. 2, showing an apparatus as the 11th embodiment of a chemical reaction apparatus 100 according to the present invention.

The 11th embodiment includes the thin-film heater 23 of the ninth embodiment in addition to the arrangement of the fourth embodiment shown in FIG. 9.

In the 11th embodiment, if a reaction product discharged from an outlet port 20 of a third substrate 17 contains a combustible component, this reaction product is supplied to a separator 51, and the separator 51 separates the reaction product to be originally extracted, i.e., a power generation product and the combustible component. This separated combustible component and oxygen taken from the atmosphere are supplied as a combustion fluid to an inlet port 26 of a sixth substrate 24. This arrangement has the same effects as the ninth embodiment. In addition, as in the 10th embodiment, no combustion gas need be supplied, so no arrangement for supplying a combustion gas is necessary. Accordingly, an apparatus using the chemical reaction apparatus 100 can be made compact and low-cost.

(12th Embodiment)

Figure 18:
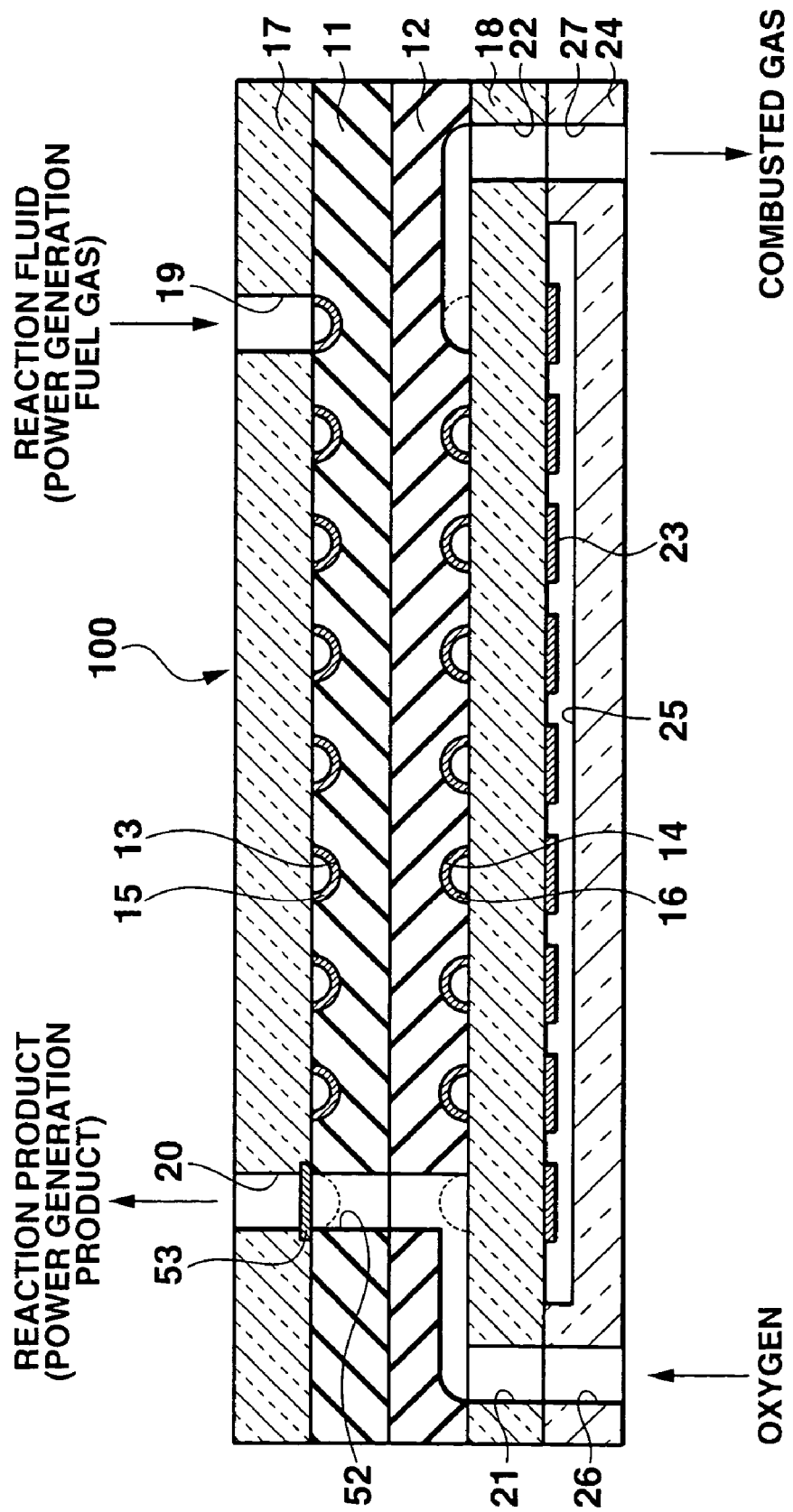
FIG. 18 is a sectional view of the 12th embodiment of the chemical reaction apparatus according to the present invention.

FIG. 18 is a sectional view, similar to FIG. 2, showing an apparatus as the 12th embodiment of a chemical reaction apparatus 100 according to the present invention.

The 12th embodiment includes the thin-film heater 23 of the ninth embodiment in addition to the arrangement of the fifth embodiment shown in FIG. 10.

In the arrangement of the 12th embodiment, at an outlet port 20 of a flow path 13 of a first substrate 11, a component such as hydrogen of a reaction product transmitted through a separation film 53 is discharged from the outlet port 20 of a third substrate 17, and a combustible component of the reaction product not transmitted through the separation film 53 is introduced into a communication hole 52. This combustible component is introduced into an inlet port 21 of the flow path 14 of a second substrate 12, and mixed with oxygen taken from the atmosphere through an inlet port 26 of a sixth substrate 24 and the inlet port 21 of a fourth substrate 18. The mixture is supplied as a combustion fluid to the flow path 14. As a consequence, this apparatus has the same effects as the ninth embodiment. In addition, as in the 10th embodiment, no combustion gas need be supplied, so no arrangement for supplying a combustion gas is necessary. Furthermore, since the separator 51 in the arrangement of the 11th embodiment is unnecessary, the apparatus can be simplified. Accordingly, the apparatus can be made more compact and low-cost.

(13th Embodiment)

Figure 19:
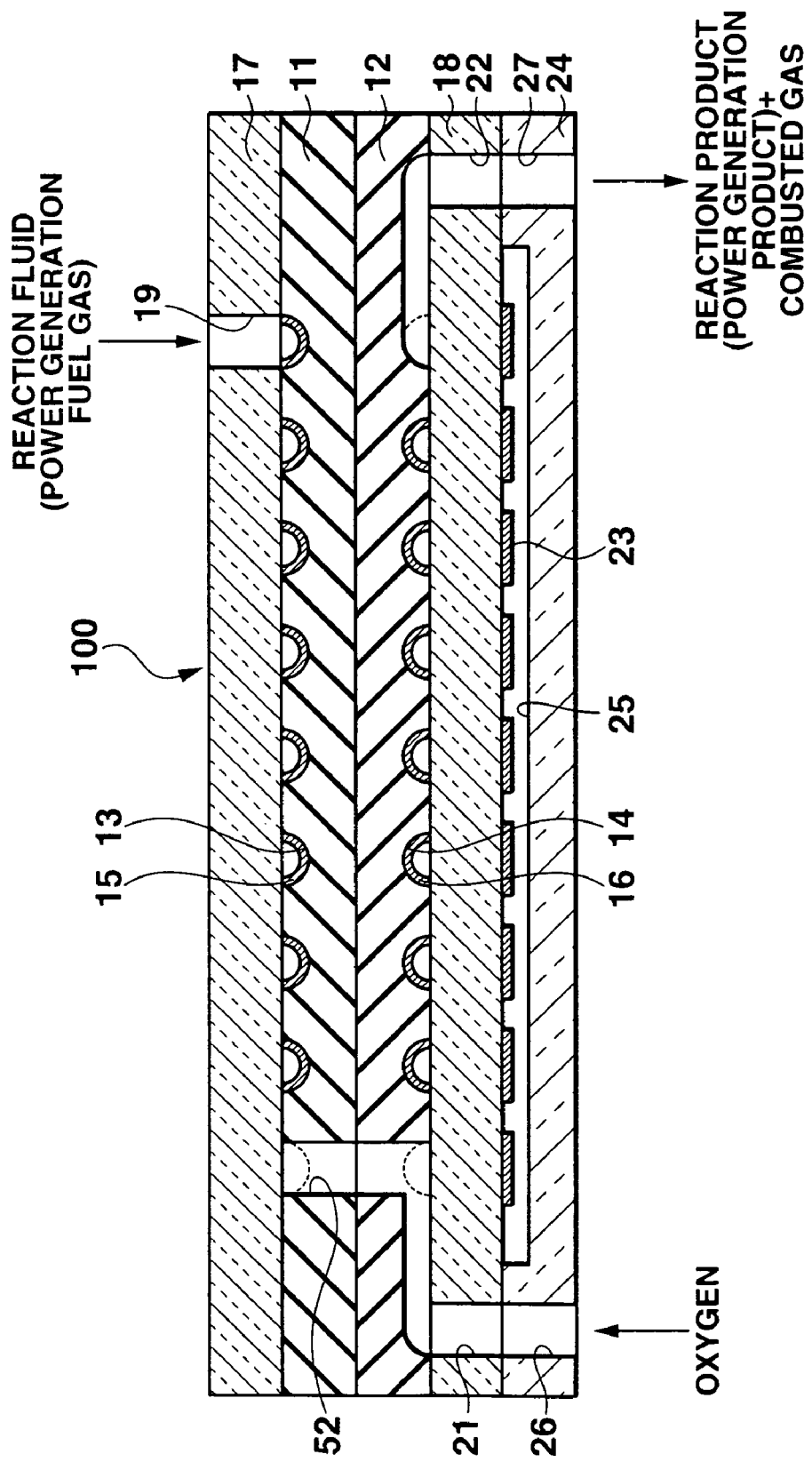
FIG. 19 is a sectional view of the 13th embodiment of the chemical reaction apparatus according to the present invention.

FIG. 19 is a sectional view, similar to FIG. 2, showing an apparatus as the 13th embodiment of a chemical reaction apparatus 100 according to the present invention.

The 13th embodiment includes the thin-film heater 23 of the ninth embodiment in addition to the arrangement of the sixth embodiment shown in FIG. 11.

In the arrangement of the 13th embodiment, when a reaction product is introduced to an inlet port 21 of a flow path 14 of a second substrate 12 from a flow path 13 of a first substrate 11 through a communication hole 52 and this reaction product contains a combustible component, the reaction product and oxygen taken from the atmosphere through an inlet port 26 of a sixth substrate 24 and the inlet port 21 of a fourth substrate 18 are supplied as a combustion fluid to the flow path 14. As a consequence, this apparatus has the same effects as the ninth embodiment. In addition, as in the 10th embodiment, no combustion gas need be supplied, so no arrangement for supplying a combustion gas is necessary. Furthermore, since the separation film 53 in the arrangement of the 12th embodiment is unnecessary, the apparatus can be simplified. Accordingly, the apparatus can be made more compact and low-cost.

(14th Embodiment)

Figure 20:
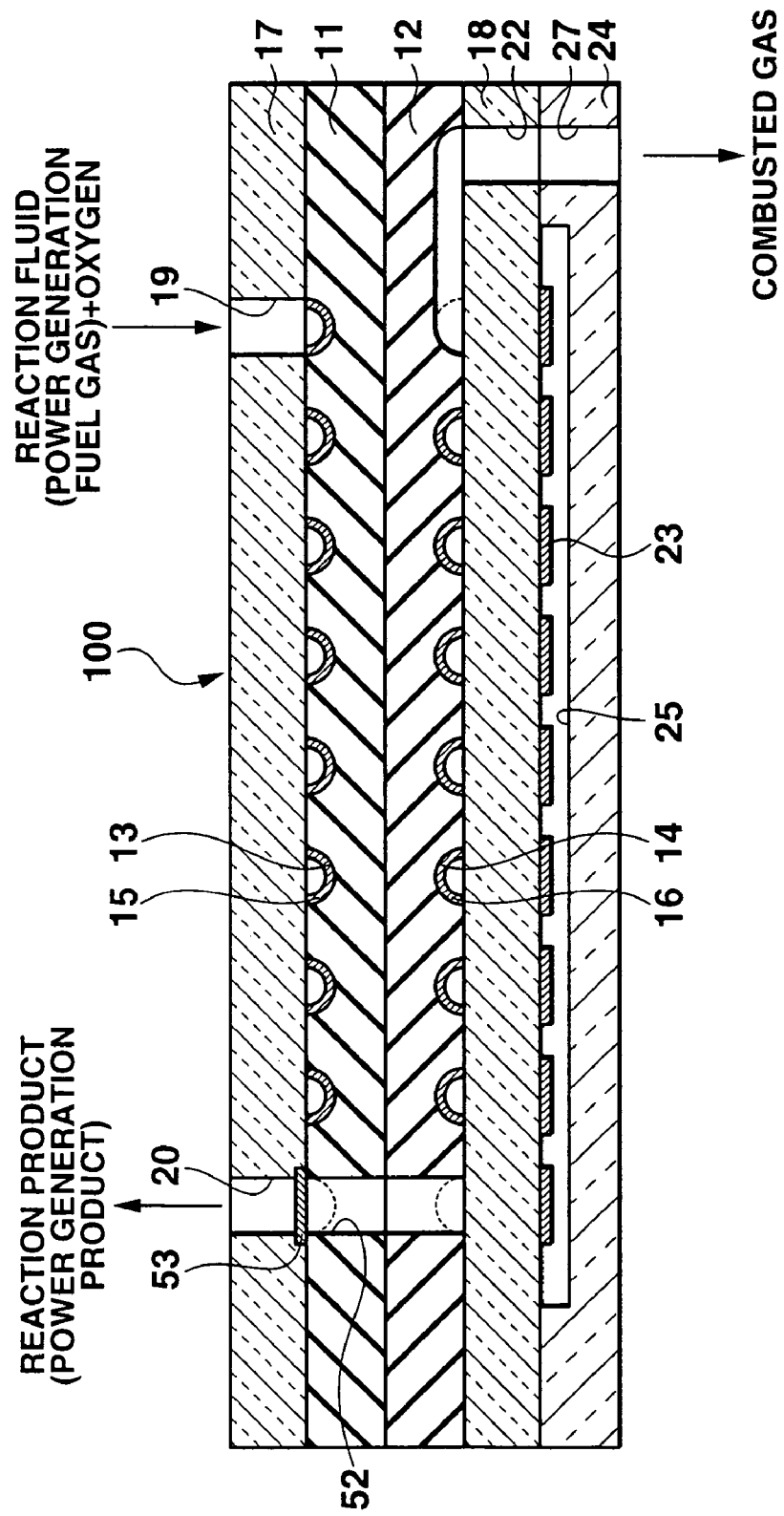
FIG. 20 is a sectional view of the 14th embodiment of the chemical reaction apparatus according to the present invention.

FIG. 20 is a sectional view, similar to FIG. 2, showing an apparatus as the 14th embodiment of a chemical reaction apparatus 100 according to the present invention.

The 14th embodiment includes the thin-film heater 23 of the ninth embodiment in addition to the arrangement of the seventh embodiment shown in FIG. 12.

In the arrangement of the 14th embodiment, a reaction fluid and oxygen taken from the atmosphere are supplied to an inlet port 19 of a third substrate 17. Of the reaction product, a component such as hydrogen transmitted through a separation film 53 is discharged from an outlet port 20 of the third substrate 17, and a combustible component not transmitted through the separation film 53 is introduced into a communication hole 52 and then to a flow path 14 of a second substrate 12. As a consequence, this apparatus has the same effects as the ninth embodiment. In addition, as in the 10th embodiment, no combustion gas need be supplied, so no arrangement for supplying a combustion gas is necessary. Furthermore, the inlet port for taking oxygen form the atmosphere is eliminated from the arrangement of the 13th embodiment, and the inlet port for a reaction fluid is used for the purpose. Therefore, the apparatus can be simplified and made compact and low-cost.

(15th Embodiment)

Figure 21:
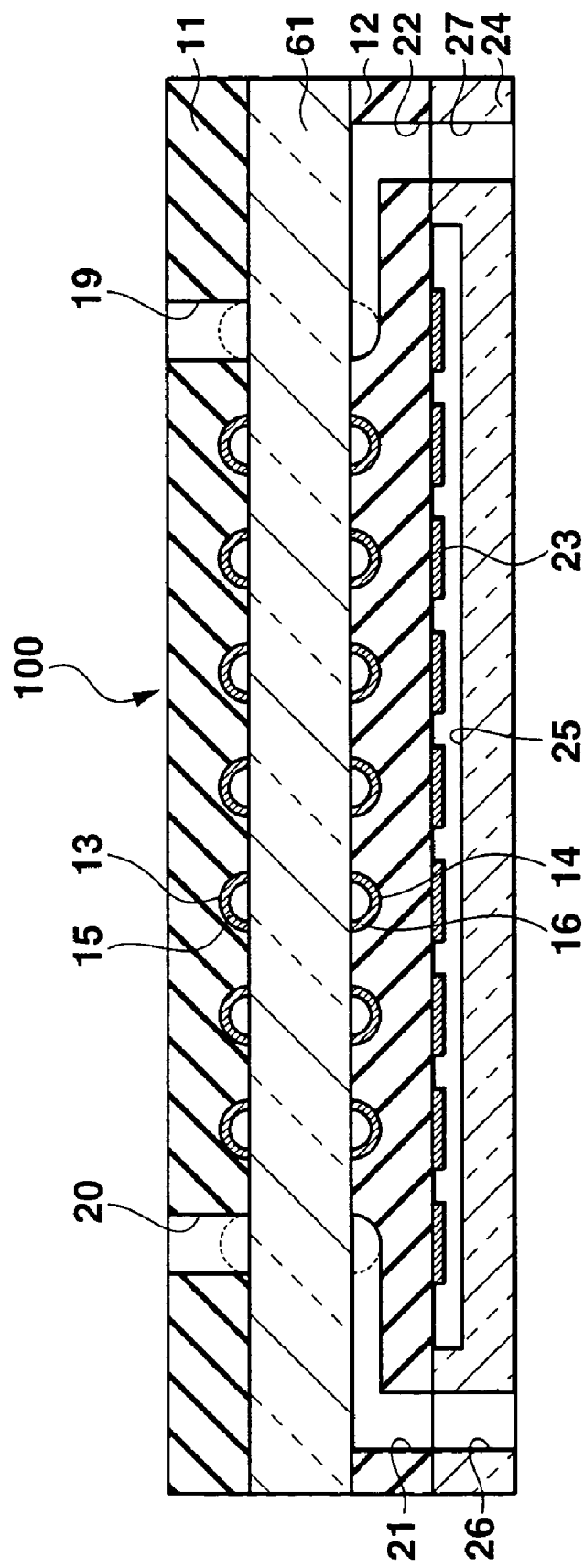
FIG. 21 is a sectional view of the 15th embodiment of the chemical reaction apparatus according to the present invention.

FIG. 21 is a sectional view, similar to FIG. 2, showing an apparatus as the 15th embodiment of a chemical reaction apparatus 100 according to the present invention.

The 15th embodiment includes the thin-film heater 23 of the ninth embodiment in addition to the arrangement of the eighth embodiment shown in FIG. 13.

This apparatus includes a first substrate 11 having a first flow path 13 formed in it, a second substrate 12 having a second flow path 14 formed in it, and a fifth substrate 61 stacked and bonded between these first and second substrates 11 and 12. The flow path 13 formation surface of the first substrate 11 is bonded to one surface of the fifth substrate 61, and the flow path 14 formation surface of the second substrate 12 shown in FIG. 21 is bonded to the other surface of the fifth substrate 61. Consequently, this arrangement can decrease the thickness of the chemical reaction apparatus 100. Accordingly, an apparatus using this chemical reaction apparatus can be made thin and compact.

In each of the ninth to 15th embodiments as described above, the arrangement of the thin-film heater 23 formed on the outer surface of the fourth substrate 18 in the ninth embodiment is added as a thin-film heater to the arrangement of a corresponding one of the second to eighth embodiments described earlier. However, the present invention is not limited to these embodiments, and it is also possible to apply, as a thin-film heater, the arrangement of the thin-film heater 50 in the first embodiment which is bonded to one surface of the first substrate 11 and so designed as to close the reaction flow path 13.

<Power Supply System>

An arrangement in which the chemical reaction apparatus according to the present invention is applied to a power supply system using a fuel reforming type fuel cell will be described below.

Figure 22:
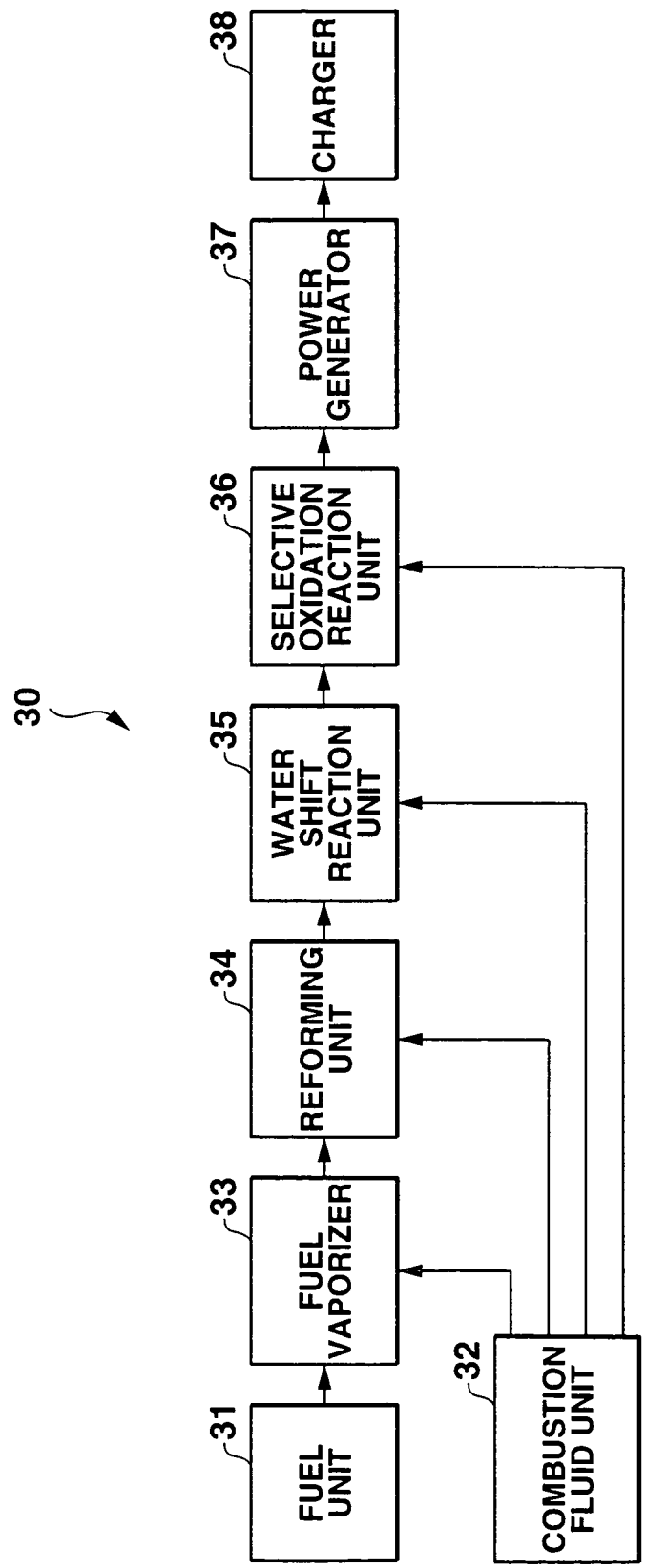
FIG. 22 is a block diagram showing an outline of the arrangement of a power supply system using a fuel cell, to which the chemical reaction apparatus according to the present invention is applied.

FIG. 22 is a block diagram showing an outline of the arrangement of a power supply system 30 using a fuel cell. The power supply system 30 comprises a fuel unit 31, combustion fluid unit 32, fuel vaporizer 33, reforming unit 34, water shift reaction unit 35, selective oxidation reaction unit 36, power generator 37, and charger 38. Of these units, the chemical reaction apparatus 100 having the arrangement of any embodiment described above can be applied to the fuel vaporizer 33, reforming unit 34, water shift reaction unit 35, and selective oxidation reaction unit 36.

The fuel unit 31 includes a fuel pack in which power generation fuel, e.g., an aqueous solution of methanol ($CH_3OH+H_2O$) is sealed, and a fuel pump, and supplies the power generation fuel to the fuel vaporizer 33.

The combustion fluid unit 32 is a cylinder in which a combustion gas, e.g., hydrogen gas is sealed, and supplies this combustion gas to the fuel vaporizer 33, reforming unit 34, water shift reaction unit 35, and selective oxidation reaction unit 36. As described in the second to seventh embodiments and ninth to 14th embodiments, it is also possible to use a portion of a gas based on power generation fuel as the combustion gas without using the combustion fluid unit 32.

The fuel vaporizer 33 vaporizes the power generation fuel supplied from the fuel unit 31. When the chemical reaction apparatus 100 having the arrangement of, e.g., the ninth embodiment described above is applied to the fuel vaporizer 33, no reaction catalyst layer 15 is formed in the flow path 13. In the fuel vaporizer 33, a combustion fluid consisting of the combustion gas from the combustion fluid unit 32 and oxygen (air) taken from the atmosphere is first supplied into the second flow path 14 of the second substrate 12. The supplied combustion fluid passes over the combustion catalyst layer 16 and combusts by a combustion reaction with the combustion catalyst layer 16. Thermal energy is generated by this combustion. At the same time, predetermined electric power is supplied to the thin-film heater 23 to generate heat. This heat and the thermal energy described above heat the interior of the flow path 13 of the first substrate 11 to a predetermined temperature, e.g., about 120° C. The power generation fuel from the fuel unit 31 is supplied into the flow path 13 of the first substrate 11. As a consequence, the power generation fuel is vaporized in the first flow path 13. The vaporized power generation fuel gas is discharged from the outlet port 20 and supplied to the reforming unit 34.

The reforming unit 34 produces hydrogen by reforming the power generation fuel gas supplied from the fuel vaporizer 33. When the chemical reaction apparatus 100 having the arrangement of, e.g., the ninth embodiment described above is applied to the reforming unit 34, a reaction catalyst layer 15 for reforming is formed in the flow path 13 of the first substrate 11. The reaction catalyst layer 15 is made of a reforming catalyst such as Cu, ZnO, or $Al_2O_3$.

In the reforming unit 34, a combustion fluid consisting of the combustion gas from the combustion fluid unit 32 and oxygen (air) taken from the atmosphere is first supplied into the second flow path 14 of the second substrate 12. The supplied combustion fluid combusts by a combustion reaction on the combustion catalyst layer 16, and thermal energy is generated by this combustion. At the same time, predetermined electric power is supplied to the thin-film heater 23 to generate heat. This heat and the thermal energy described above heat the interior of the flow path 13 of the first substrate 11. The power generation fuel gas (e.g., a gas formed by vaporizing an aqueous solution of methanol) is supplied from the fuel vaporizer 33 into the flow path 13 of the first substrate 11 to heat the interior of the flow path 13 to a predetermined temperature, e.g., about 280° C. This induces an endothermic reaction as indicated by $$CH_3OH+H_2O \rightarrow 3H_2+CO_2 \qquad (1)$$

and produces hydrogen and carbon dioxide as a byproduct.

In the initial stages of this reaction, water ($H_2O$) on the left side of formula (1) above may be water contained in the fuel in the fuel unit 31. However, it is also possible to collect and use water produced when the power generator 37 to be described later generates electric power. That is, the supply source of water ($H_2O$) on the left side of formula (1) in the reforming unit 34 may be the power generator 37 alone, both the power generator 37 and fuel unit 31, or the fuel unit 31 alone.

During the reaction, carbon monoxide is sometimes produced, albeit in a slight amount, in the reforming unit 34 as in a chemical reaction formula indicated by $$2CH_3OH+H_2O \rightarrow 5H_2+CO+CO_2 \qquad (2)$$

The products (hydrogen and carbon dioxide) on the right side of formula (2) above and the slight amount of carbon monoxide are discharged from the outlet port 20 of the reforming unit 34.

Of the products discharged from the outlet port 20 of the reforming unit 34, the vaporized hydrogen and carbon monoxide are supplied to the water shift reaction unit 35 and selective oxidation reaction unit 36. The carbon dioxide is separated and discharged to the atmosphere.

The water shift reaction unit 35 and selective oxidation reaction unit 36 form a carbon monoxide removing unit which removes carbon monoxide produced by the reforming unit 34.

When the chemical reaction apparatus 100 having the arrangement of, e.g., the ninth embodiment described above is applied to the water shift reaction unit 35, a reaction catalyst layer 15 for removing carbon monoxide is formed in the flow path 13 of the first substrate 11. The reaction catalyst layer 15 is made of a selective oxidation catalyst such as Pt or $Al_2O_3$. In the water shift reaction unit 35, a combustion fluid consisting of the combustion gas from the combustion fluid unit 32 and oxygen (air) taken from the atmosphere is first supplied into the second flow path 14 of the second substrate 12. The supplied combustion fluid combusts by a combustion reaction on the combustion catalyst layer 16, and thermal energy is generated by this combustion. At the same time, predetermined electric power is supplied to the thin-film heater 23 to generate heat. This heat and the thermal energy described above heat the interior of the flow path 13 of the first substrate 11. In addition, the vaporized hydrogen and carbon monoxide are supplied from the reforming unit 34 into the flow path 13 of the first substrate 11 to heat the interior of the flow path 13 to a predetermined temperature, e.g., about 180° C. Consequently, of the hydrogen, carbon monoxide, and water supplied into the flow path 13, the carbon monoxide and water cause a water shift reaction with the catalyst to convert hydrogen and carbon dioxide as a byproduct as indicated by $$CO+H_2O \rightarrow H_2+CO_2 \qquad (3)$$

In the initial stages of this reaction, water ($H_2O$) on the left side-of formula (3) above may be water contained in the fuel in the fuel unit 31. However, it is also possible to collect water produced when the power generator 37 generates electric power, and supply this water to the water shift reaction unit 35. The supply source of water on the left side of formula (3) in the water shift reaction unit 35 may be the power generator 37 alone, both the power generator 37 and fuel unit 31, or the fuel unit 31 alone.

The selective oxidation reaction unit 36 performs a heat treatment for the gas mixture supplied from the water shift reaction unit 35. If a very slight amount of carbon monoxide is contained in this gas mixture supplied from the water shift reaction unit 35, the selective oxidation reaction unit 36 selects the residual carbon monoxide by a catalyst, and brings the selected carbon monoxide into contact with oxygen taken from the atmosphere, thereby reliably removing the carbon monoxide by converting the carbon monoxide into carbon dioxide by a chemical reaction indicated by $$CO+(1/2)O_2 \rightarrow CO_2 \qquad (4)$$

The fluid finally reaching the outlet port 20 of the selective oxidation reaction unit 36 mostly consists of hydrogen and carbon dioxide.

The products after the series of reactions described above are hydrogen and carbon dioxide. Of these products, the carbon dioxide is separated from the hydrogen and discharged to the atmosphere. Accordingly, only the hydrogen is supplied to the power generator 37.

Figure 23:
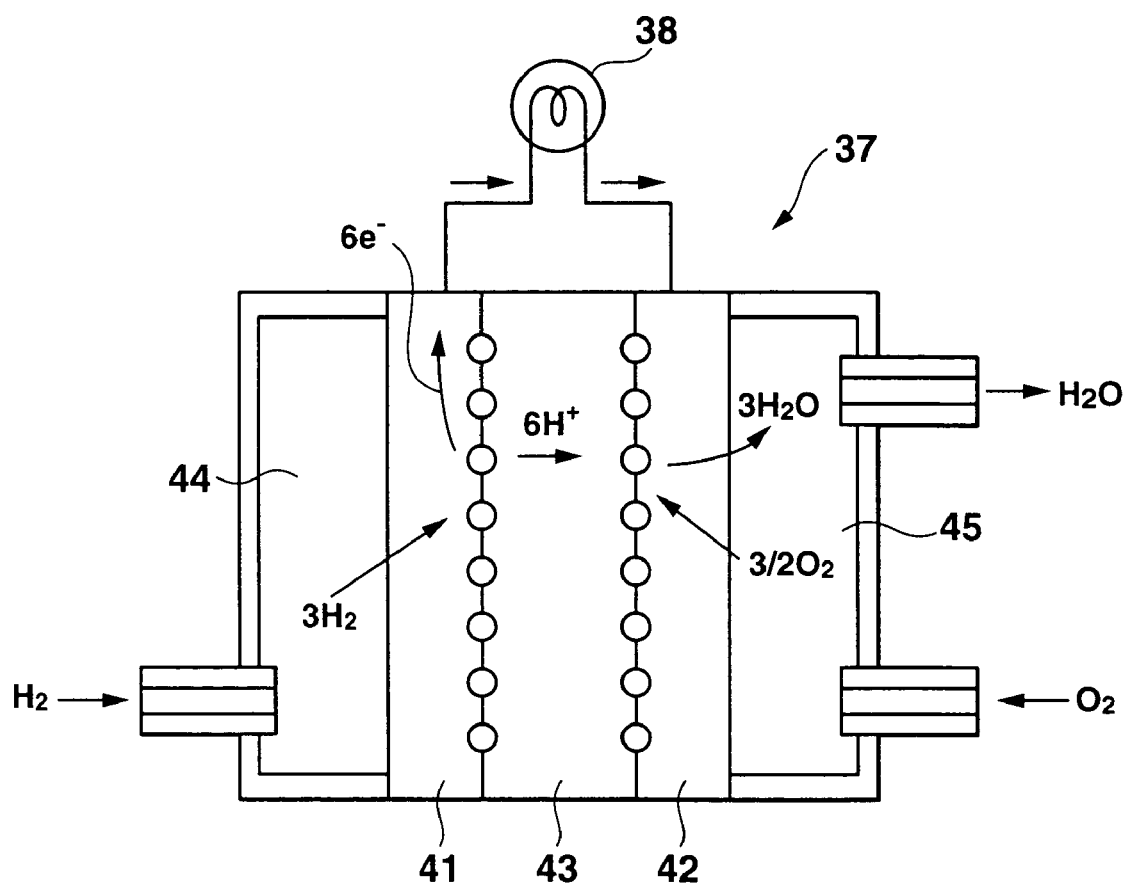
FIG. 23 is a schematic view showing the arrangement of a polymer electrolyte fuel cell applied to the fuel cell to which the chemical reaction apparatus according to the present invention is applied.

FIG. 23 shows an outline of the arrangement of a polymer electrolyte fuel cell applied to the power generator 37. The power generator 37 has a cathode 41 which is a carbon electrode to which a catalyst such as Pt or C is adhered, an anode 42 which is a carbon electrode to which a catalyst such as Pt, Ru, or C is adhered, and an ion conductive film 43 interposed between the cathode 41 and anode 42, and supplies electric power to the charger 38 positioned between the cathode 41 and anode 42.

A space 44 is formed outside the cathode 41. Hydrogen is supplied into the space 44 from the carbon monoxide removing unit, and this hydrogen is supplied to the cathode 41. Also, a space 45 is formed outside the anode 42. Oxygen taken from the atmosphere via a check valve is supplied into the space 45, and this oxygen is supplied to the anode 42.

On the side of the cathode 41, hydrogen ions (protons; H$^+$) are generated by separating electrons (e$^-$) from hydrogen and move to the anode 42 through the ion conductive film 43, and the electrons (e$^-$) are extracted by the cathode 41 and supplied to the charger 38, as indicated by

$$3H_2 \rightarrow 6H^+ + 6e^- \tag{5}$$

On the side of the anode 42, the electrons (e$^-$) supplied via the charger 38, the hydrogen ions (H$^+$) passing through the ion conductive film 43, and oxygen react with each other to produce water as a byproduct, as indicated by

$$6H^+ + (3/2)O_2 + 6e^- \rightarrow 3H_2O \tag{6}$$

The series of electrochemical reactions (formulas (4) and (5)) as described above progress in an environment at a relatively low temperature from about room temperature to about 80° C., and the only byproduct except for electric power is basically water. This water produced as a byproduct by the power generator 37 is collected. If at least a portion of the water produced by the power generator 37 is supplied to the reforming unit 34 as described previously, the amount of water initially sealed in the fuel unit 31 can be reduced, and the amount of water to be collected can also be reduced.

The electric power thus generated by the power generator 37 is supplied to the charger 38.

The charger 38 includes a power holding means such as a secondary battery or capacitor, and charges this secondary battery or capacitor with the electric power supplied from the power generator 37, thereby temporarily holding the supplied power. In addition, the charger 38 supplies the held electric power to an apparatus which is driven by this power supply system.

Fuel applied to a fuel reforming type fuel cell currently being researched and developed is liquid fuel, liquefied fuel, or gas fuel containing at least a hydrogen element. This fuel need only be fuel with which the power generator 37 can generate electric energy at a relatively high energy conversion efficiency. In addition to methanol described above, it is possible to preferably use alcohol-based liquid fuel such as ethanol or butanol, liquid fuel such as dimethylether, isobutane, or natural gas (CNG) which is vaporized at room temperature and atmospheric pressure and made of hydrocarbon, or gas fuel such as hydrogen gas.

Figure 24:
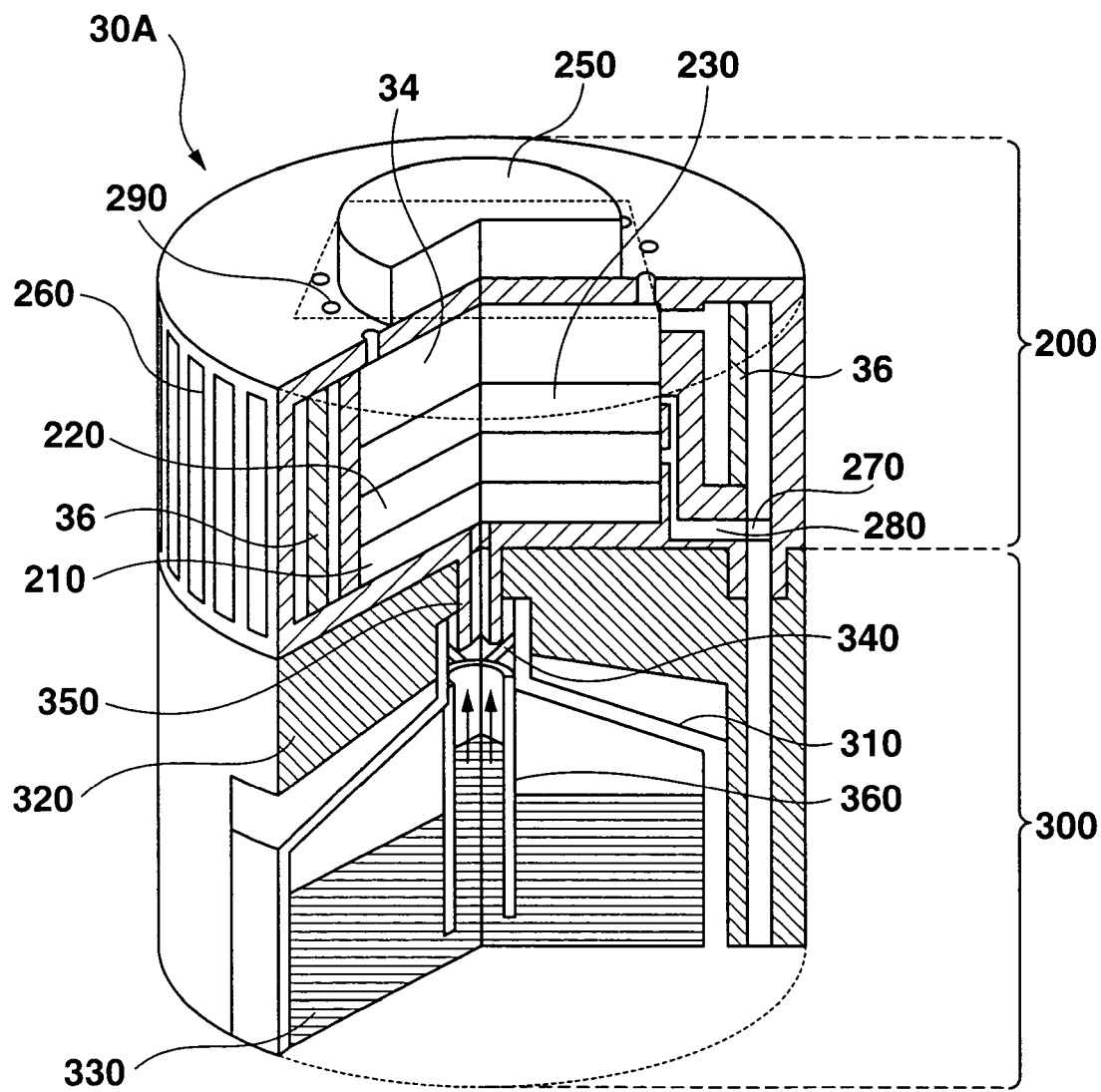
FIG. 24 is a schematic view showing the main parts of a practical arrangement of the whole power supply system using the fuel cell, to which the chemical reaction apparatus according to the present invention is applied.
Figure 25:
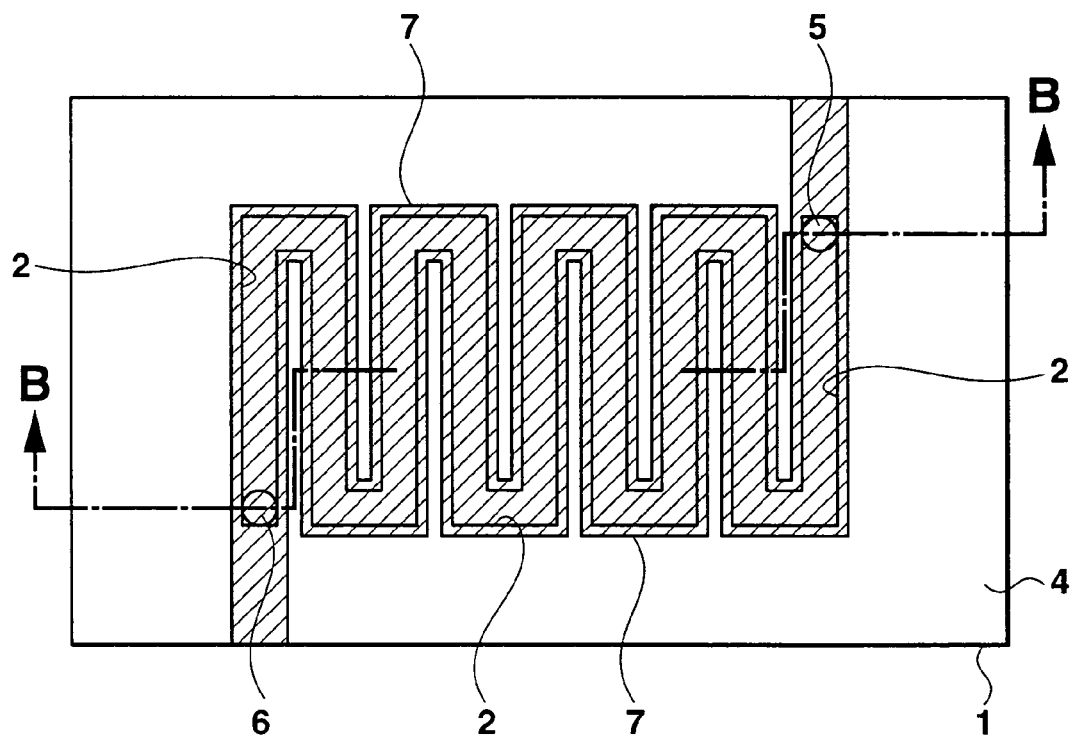
FIG. 25 is an opened-up plan view of an example of the conventional chemical reaction apparatus.
Figure 26:
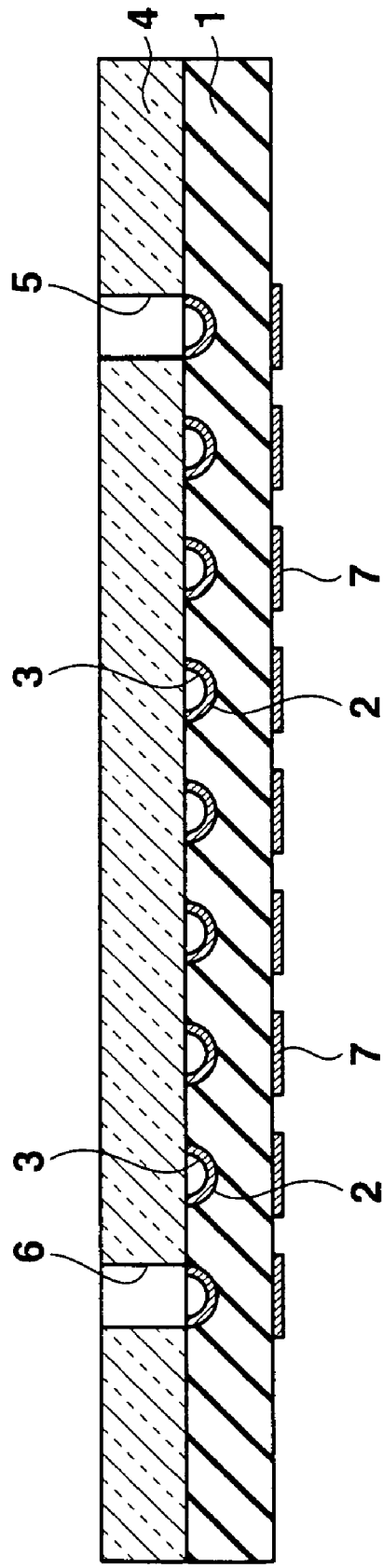
FIG. 26 is a sectional view of the example of the conventional chemical reaction apparatus.

FIG. 24 is a schematic view showing the main parts of a practical arrangement when a power supply system using a fuel cell to which the chemical reaction apparatus according to the present invention is applied is formed as one module. FIG. 24 shows merely an application example of the chemical reaction apparatus according to the present invention, and hence does not limit the scope of the invention at all.

A power supply system 30A includes a fuel reforming type fuel cell and the components indicated by the blocks shown in FIG. 22. The same reference numbers as in FIG. 22 denote the same parts in FIG. 24, and an explanation thereof will be omitted or simplified. For example, assume that the chemical reaction apparatus has the arrangement as described in any of the ninth to 14th embodiments in which a portion of a gas based on the power generation fuel is used as a combustion gas, so the combustion fluid unit 32 is not included.

As shown in FIG. 24, the power supply system 30A has, e.g., a columnar outer shape equivalent to a general-purpose chemical cell. The outer shape is not of course limited to this, so another appropriate shape may be used in accordance with the use, capacity, and the like.

As shown in FIG. 24, the power supply system 30A according to this practical arrangement is roughly divided into a power generating unit 200 and fuel supply unit 300. The fuel supply unit 300 corresponds to the fuel unit 31 shown in FIG. 22, and includes a fuel vessel or fuel pack 310, a holder unit 320 to which the fuel vessel 310 is detachably attached, a fuel pump (not shown), and the like. The fuel pack 310 is filled with power generation fuel 330, and has a fuel supply valve 340 for preventing a leak of the power generation fuel 330 in a portion connected to the holder unit 320.

When the fuel pack 310 is connected to the holder unit 320, a fuel delivery pipe 350 formed in the holder unit 320 pushes the fuel supply valve 340 downward, and the power generation fuel 330 is delivered from a fuel supply pipe 360 to the power generating unit 200 via the fuel delivery pipe 350 by the surface tension or the fuel pump.

The power generating unit 200 includes components corresponding to the fuel vaporizer 33, reforming unit 34, water shift reaction unit 35, selective oxidation reaction unit 36, power generator 37, and charger 38 shown in FIG. 22. The chemical reaction apparatus 100 of any embodiment described above is applied to the fuel vaporizer 33, reforming unit 34, water shift reaction unit 35, and selective oxidation reaction unit 36. In this apparatus, a flow path having a depth and width of 500 µm or less is formed using, e.g., the micromachine manufacturing technology, thereby forming a microspace. As heating element for each flow path, the apparatus includes a flow path which has a combustion catalyst formed in it and in which a combustion fluid is supplied, and a thin-film heater for heating.

More specifically, as shown in FIG. 24, the power generator 37 is extended along the inner surface of a cylindrical inner wall which is coaxially fixed with a predetermined spacing to the inside of a cylindrical outer wall forming a housing. The fuel vaporizer 33, reforming unit 34, water shift reaction unit 35, and selective oxidation reaction unit 36 are formed in a fuel vaporizer formation frame 210, reforming unit formation frame 220, water shift reaction unit formation frame 230, and selective oxidation reaction unit formation frame 240, respectively, each of which is formed in the internal space of the power generating unit 200. Each formation frame corresponds to the support member 80 shown in FIG. 5, and each chemical reaction apparatus is formed in a corresponding formation frame with a predetermined space between them. These formation frames may be separated from each other by partitions, or may also be formed as one frame in which the fuel vaporizer 33, reforming unit 34, water shift reaction unit 35, and selective oxidation reaction unit 36 are stacked. The heat-insulating performance can be improved by sealing, in the space of each formation frame, a gas such as air, freon, or carbonic acid gas having thermal conductivity lower than that of the constituent members of the formation frame. The heat-insulating performance may be further improved by setting a substantially vacuum state in this space. To avoid complexity of the drawing, FIG. 22 shows only the individual formation frames.

The charger 38 is formed into a microchip or the like and placed in, e.g., a projecting terminal 250 or another space in the power generating unit 200.

The power generating unit 200 includes a plurality of ventilation holes (slits) 260 for supplying external air from the circumferential surface of the column of the power generating unit 200 to the anode 42 of the power generator 37, a separating/collecting unit 270 for liquefying (condensing) byproducts (e.g., water) produced on the anode 42, thereby separating and collecting the byproducts, a byproduct supply path 280 for supplying a portion of the collected byproducts to the carbon monoxide removing unit made up of the reforming unit 34 and water shift reaction unit 35, and an exhaust hole 290 which extends from the column upper surface to the space 44 in the power generator 37, and exhausts to the outside a byproduct (e.g., carbon dioxide) which is produced in at least the fuel electrode 41 of the power generator 37, the reforming unit 34, and the selective oxidation reaction unit 36, and which is a material not to be collected.

In the power supply system having the above arrangement, the chemical reaction apparatus 100 of any of the embodiments of the present invention is applied to the fuel vaporizer 33, reforming unit 34, water shift reaction unit 35, and selective oxidation reaction unit 36. As a heating element of a flow path for a chemical reaction, the system includes a means which uses thermal energy generated by the combustion reaction, caused by a combustion catalyst layer, of a combustion fluid. This eliminates power consumption required for heating, and downsizes the power generating unit 200. In addition, a means which heats by using heat generated by a thin-film heater is also used as a heating element. This makes precise temperature control and an efficient chemical reaction possible, thereby increasing the power generation efficiency.

The invention claimed is:

1. A chemical reaction apparatus comprising:
   a first substrate in which a reaction flow path, in which a fluid material containing hydrogen atoms as compositions flows, is formed, a reaction catalyst layer being formed in at least a portion of the reaction flow path, and a reaction of the reaction fluid on the reaction catalyst layer being caused in the reaction flow path to produce reaction products including hydrogen gas; and
   a second substrate including a heating element which comprises: a combustion flow path which is formed in the second substrate to correspond to the reaction flow path, and in which a combustion fluid flows, and a combustion catalyst layer formed in at least a portion of the combustion flow path, the combustion catalyst layer being different from the reaction catalyst layer, and the heating element heating the fluid material flowing in the reaction flow path by a reaction of the combustion fluid on the combustion catalyst layer to cause the reaction in the reaction flow path;
   wherein the first substrate and the second substrate are stacked.

2. A chemical reaction apparatus according to claim 1, wherein at least one of the first and second substrates comprises a silicon substrate.

3. A chemical reaction apparatus according to claim 1, further comprising a heat radiation preventing film covering at least a portion of outermost surfaces of the first and second substrates.

4. A chemical reaction apparatus according to claim 3, wherein the radiation preventing film is one of: a metal film made of a material selected from the group consisting of Au, Al, and Ag, and a metal oxide film made of a material selected from the group consisting of $SnO_2$, $InO_3$, and ZnO.

5. A chemical reaction apparatus according to claim 1, further comprising a box member in which the first and second substrates are provided, wherein a space is formed in at least a partial portion between the box member and the outermost surfaces of the first and second substrates.

6. A chemical reaction apparatus according to claim 5, wherein one of: the space is in a substantially vacuum state, and a gas having a thermal conductivity lower than a thermal conductivity of components of the box member is sealed in the space.

7. A chemical reaction apparatus according to claim 1, wherein the combustion fluid supplied to the combustion flow path includes oxygen.

8. A chemical reaction apparatus according to claim 1, wherein a first fluid is supplied to the reaction flow path, and the combustion fluid supplied to the combustion flow path comprises the first fluid and a second fluid containing oxygen.

9. A chemical reaction apparatus according to claim 1, wherein a first fluid is supplied to the reaction flow path, and the combustion fluid supplied to the combustion flow path comprises a second fluid containing oxygen and a third fluid formed by separating and removing hydrogen from a fluid discharged from the reaction flow path.

10. A chemical reaction apparatus according to claim 1, further comprising:
    an inlet port and outlet port corresponding to a first end portion and a second end portion, respectively, of the reaction flow path;
    an inlet port and outlet port corresponding to a first end portion and a second end portion, respectively, of the combustion flow path;
    a separation film, which is formed between the second end portion of the reaction flow path and the outlet port of the reaction flow path, and which selectively transmits hydrogen; and
    a communication hole formed in the first and second substrates between the second end portion of the reaction flow path and the first end portion of the combustion flow path;
    wherein a first fluid is supplied to the inlet port of the reaction flow path, a second fluid containing oxygen is supplied to the inlet port of the combustion flow path, and a third fluid formed by separating and removing hydrogen from a fluid discharged from the second end portion of the reaction flow path is supplied to the communication hole.

11. A chemical reaction apparatus according to claim 1, further comprising:
    an inlet port corresponding to a first end portion of the reaction flow path;
    an inlet port and outlet port formed corresponding to a first end portion and a second end portion, respectively, of the combustion flow path; and
    a communication hole formed in the first and second substrates between a second end portion of the reaction flow path and the first end portion of the combustion flow path;
    wherein a first fluid is supplied to the inlet port of the reaction flow path, a fluid discharged from the second end portion of the reaction flow path is supplied to the communication hole, and a second fluid containing oxygen is supplied to the inlet port of the combustion flow path.

12. A chemical reaction apparatus according to claim 1, further comprising:
    an inlet port and outlet port corresponding to a first end portion and a second end portion of the reaction flow path;
    an outlet port formed corresponding to a second end portion of the combustion flow path;
    a separation film, which is formed between the second end portion of the reaction flow path and the outlet port of the reaction flow path, and which selectively transmits hydrogen; and
    a communication hole formed in the first and second substrates between the second end portion of the reaction flow path and a first end portion of the combustion flow path;
    wherein a first fluid is supplied to the inlet port of the reaction flow path, and a fluid formed by separating and removing hydrogen from a fluid discharged from the second end portion of the reaction flow path through the communication hole is supplied to the first end portion of the combustion flow path.

13. A chemical reaction apparatus according to claim 1, further comprising:
a fluid supplying unit which supplies the fluid to the reaction flow path, and
a vaporizing unit which vaporizes the fluid in the reaction flow path by heating an interior of the reaction flow path by the heating element.

14. A chemical reaction apparatus according to claim 1, wherein the reaction catalyst layer comprises a reforming catalyst, and the chemical reaction apparatus further comprises:
a fluid supplying unit which supplies the fluid to the reaction flow path; and
a reforming unit which reforms the fluid in the reaction flow path by heating an interior of the reaction flow path by the heating element, so that hydrogen is produced.

15. A chemical reaction apparatus according to claim 14, wherein the fluid supplied to the reaction flow path comprises an aqueous solution of methanol.

16. A chemical reaction apparatus according to claim 1, wherein the reaction catalyst layer comprises a selective oxidation catalyst, and the chemical reaction apparatus further comprises:
a fluid supplying unit which supplies the fluid to the reaction flow path; and
a converting unit which converts carbon monoxide in the fluid into carbon dioxide and hydrogen in the reaction flow path by heating an interior of the reaction flow path by the heating element.

17. A chemical reaction apparatus according to claim 16, wherein the fluid comprises a gas mixture of hydrogen and carbon monoxide.

18. A chemical reaction apparatus according to claim 1, wherein the heating element further comprises:
a third substrate provided with a thin-film heater which corresponds to the reaction flow path, and which supplies a predetermined heat amount to the reaction flow path.

19. A chemical reaction apparatus according to claim 18, further comprising a fourth substrate which covers the thin-film heater formed on the third substrate and is bonded to a surface of the third substrate.

20. A chemical reaction apparatus according to claim 19, wherein the fourth substrate comprises a recess in a surface opposing the thin-film heater.

21. A chemical reaction apparatus according to claim 20, wherein one of: the recess is in a substantially vacuum state, and a gas having thermal conductivity lower than a thermal conductivity of the fourth substrate is sealed in the recess.

22. A chemical reaction apparatus comprising:
a first substrate including a reaction flow path in which a fluid material containing hydrogen atoms as compositions flows, and a reaction catalyst layer formed in at least a portion of the reaction flow path, a reaction being of the reaction fluid on the reaction catalyst layer being caused in the reaction flow path to produce reaction products including hydrogen gas;
a second substrate which includes a combustion flow path formed therein in which combustion fluid flows, the combustion flow path being provided with a combustion catalyst layer that is different from the reaction catalyst layer at least at a portion thereof, a combustion reaction of the combustion fluid on the combustion catalyst layer being caused to heat the fluid in the reaction flow path; and
a third substrate which includes a thin-film heater for heating the fluid material flowing in the reaction flow path;
wherein the first, second, and third substrates are overlapped with each other with the second substrate being positioned between the first and third substrates;
wherein the first substrate includes a first surface and a second surface opposite to the first surface, and the reaction flow path is formed in the first surface of the first substrate;
wherein the second substrate includes a first surface and a second surface opposite to the first surface, the first surface of the second substrate is adjacent to the second surface of the first substrate, and the combustion flow path is formed in the second surface of the second substrate;
wherein the third substrate includes a first surface and a second surface opposite to the first surface, the first surface of the third substrate is adjacent to the second surface of the second substrate, and the thin film heater is provided on the second surface of the third substrate; and
wherein the reaction flow path, combustion flow path, and thin-film heater are arranged to correspond to one another.

23. A chemical reaction apparatus comprising:
a first substrate including a reaction flow path in which a fluid material containing hydrogen atoms as compositions flows, and a reaction catalyst layer formed in at least a portion of the reaction flow path, a reaction being of the reaction fluid on the reaction catalyst layer being caused in the reaction flow path to produce reaction products including hydrogen gas;
a second substrate which includes a combustion flow path formed therein in which combustion fluid flows, the combustion flow path being provided with a combustion catalyst layer that is different from the reaction catalyst layer at least at a portion thereof, a combustion reaction of the combustion fluid on the combustion catalyst layer being caused to heat the fluid in the reaction flow path;
means for supplying a predetermined heat amount to the fluid material flowing in the reaction flow path, said means for supplying the predetermined heat amount comprising a thin heater; and
a box member which entirely covers outermost surfaces of the first and second substrates;
wherein a space is formed at least in a part of a portion between the box member and the outermost surfaces of the first and second substrates, and the space is substantially in a vacuum state;
wherein the first and second substrates are overlapped with each other;
wherein the first substrate includes a first surface and a second surface opposite to the first surface, and the reaction flow path is formed in the first surface of the first substrate; and
wherein the second substrate includes a first surface and a second surface opposite to the first surface, the first surface of the second substrate is adjacent to the second surface of the first substrate, and the combustion flow path is formed in the second surface of the second substrate.

* * * * *